(12) United States Patent
Liu et al.

(10) Patent No.: US 12,598,565 B2
(45) Date of Patent: Apr. 7, 2026

(54) SYNCHRONIZATION COMMUNICATION WAVEFORMS FOR SIDELINK UNLICENSED (SL-U)

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Giovanni Chisci, San Diego, CA (US); Stelios Stefanatos, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 593 days.

(21) Appl. No.: 18/067,482

(22) Filed: Dec. 16, 2022

(65) Prior Publication Data

US 2023/0388947 A1 Nov. 30, 2023

(30) Foreign Application Priority Data

May 30, 2022 (GR) .................................. 0220100451

(51) Int. Cl.
*H04W 56/00* (2009.01)
*H04W 72/02* (2009.01)
*H04W 72/0446* (2023.01)

(52) U.S. Cl.
CPC ......... *H04W 56/001* (2013.01); *H04W 72/02* (2013.01); *H04W 72/0446* (2013.01)

(58) Field of Classification Search
CPC ............... H04W 56/001; H04W 72/02; H04W 72/0446; H04W 4/08; H04W 4/40; H04W 92/18

See application file for complete search history.

(56) References Cited

U.S. PATENT DOCUMENTS

| | | | | |
|---|---|---|---|---|
| 2021/0037505 A1* | 2/2021 | Kim | ...................... | H04L 5/0094 |
| 2021/0051641 A1* | 2/2021 | Si | ........................ | H04L 27/2613 |
| 2022/0353048 A1* | 11/2022 | Kim | .......................... | H04L 5/06 |
| 2025/0227737 A1* | 7/2025 | Talarico | ................ | H04L 1/1861 |

FOREIGN PATENT DOCUMENTS

| | | | |
|---|---|---|---|
| WO | 2021237654 A1 | 12/2021 | |
| WO | WO-2023212952 A1 * | 11/2023 | ............ H04W 92/18 |

OTHER PUBLICATIONS

Huawei et al., "Sidelink Synchronization Mechanisms for NR V2X", R1-1911885, 3GPP TSG RAN WG1 Meeting #99, vol. RAN WG1, No. Reno, USA, Nov. 18, 2019-Nov. 22, 2019, Nov. 9, 2019, XP051823067, 24 Pages, Sections 1-2, Sections 1-5.
International Search Report and Written Opinion—PCT/US2023/021137—ISA/EPO—Aug. 2, 2023.

* cited by examiner

*Primary Examiner* — Chae S Lee

(74) *Attorney, Agent, or Firm* — QUALCOMM Incorporated

(57) ABSTRACT

Methods, systems, and devices for wireless communications are described. A wireless communication device may receive a configuration indicating SL synchronization communication resources occupying a first portion of a shared frequency band. The wireless communication device may transmit one or more SL synchronization communications occupying a second portion of the shared frequency band, where the second portion of the shared frequency band is larger than the first portion and includes the first portion.

30 Claims, 16 Drawing Sheets

115-B

315

115-C

S-SSB 305

PSSCH Transmission 310

300

S-SSB 805

AGC Symbol 820

PSSCH Resources 810

DMRS Resources 825

PSCCH Resources 815

800

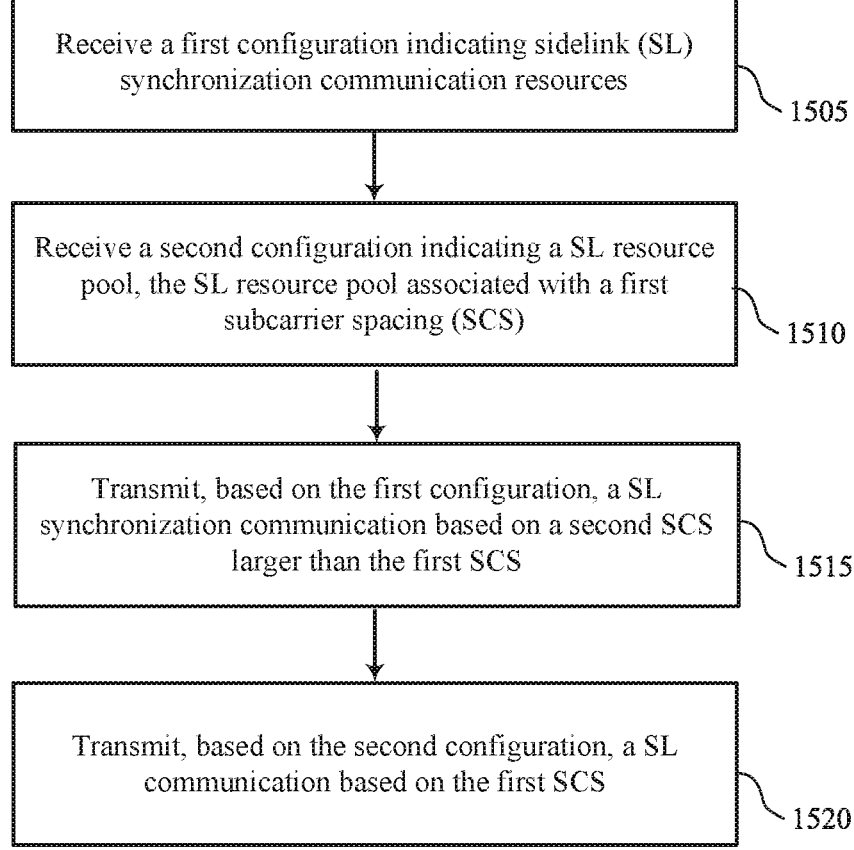

Receive a first configuration indicating sidelink (SL) synchronization communication resources                                     1505

Receive a second configuration indicating a SL resource pool, the SL resource pool associated with a first subcarrier spacing (SCS)                                     1510

Transmit, based on the first configuration, a SL synchronization communication based on a second SCS larger than the first SCS                                     1515

Transmit, based on the second configuration, a SL communication based on the first SCS                                     1520

Figure 16:
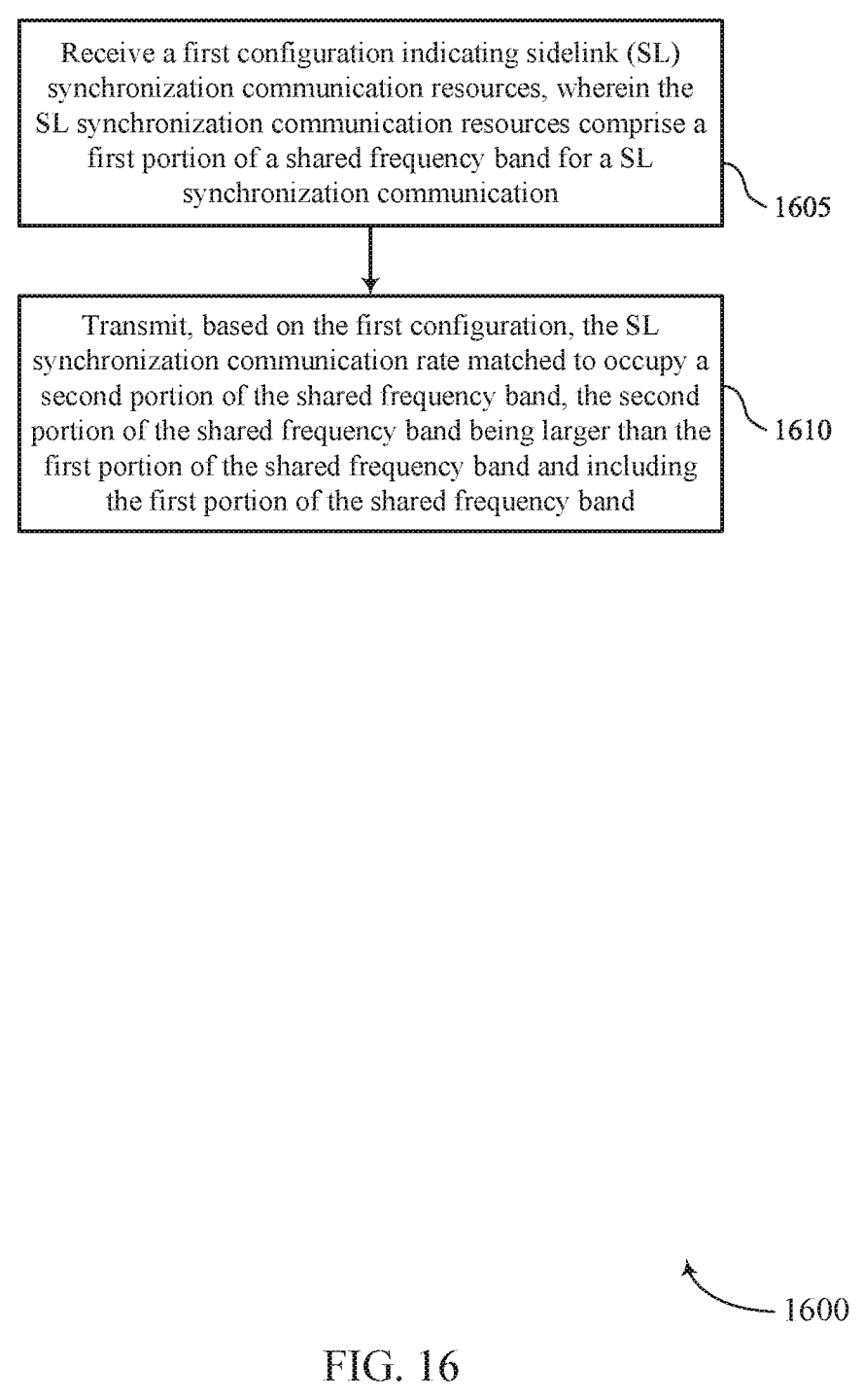

Receive a first configuration indicating sidelink (SL) synchronization communication resources, wherein the SL synchronization communication resources comprise a first portion of a shared frequency band for a SL synchronization communication

1605

Transmit, based on the first configuration, the SL synchronization communication rate matched to occupy a second portion of the shared frequency band, the second portion of the shared frequency band being larger than the first portion of the shared frequency band and including the first portion of the shared frequency band

SYNCHRONIZATION COMMUNICATION WAVEFORMS FOR SIDELINK UNLICENSED (SL-U)

CROSS-REFERENCE TO RELATED APPLICATIONS

The present application claims the benefit of and priority to Greek Patent Application No. 20220100451, filed May 30, 2022, the entirety of which is incorporated by reference herein.

FIELD OF TECHNOLOGY

The following relates to wireless communications, including sidelink synchronization communication designs for shared spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between UEs, which may be referred to as sidelink communications. In some examples, however, some sidelink signaling transmitted between UEs may be incompatible with or fail to satisfy some requirements (e.g., occupied channel bandwidth (OCB) requirements), such as for communications in shared spectrum.

SUMMARY

The described techniques relate to improved methods, systems, devices, and apparatuses that support sidelink synchronization signal block (S-SSB) communication in shared frequency bands. For example, the described techniques provide for a wireless communication device to communicate S-SSBs occupying a larger portion of the shared frequency band than indicated in a received S-SSB resource configuration. In one aspect, a wireless communication device may be configured to use a fixed subcarrier spacing (SCS) or a fixed minimum SCS for transmitting S-SSBs in S-SSB resources. For example, a UE may be configured with a SL resource pool associated with a first SCS, and the UE may communicate the S-SSB using a second SCS larger than the first SCS. Using the larger SCS may cause the S-SSB to occupy the larger portion of the shared frequency band. According to another aspect of the present disclosure, a wireless communication device may be configured to rate match at least a portion of a S-SSB to occupy a larger portion of the shared frequency band. For example, a UE may be configured with a first quantity of RBs for one or more S-SSBs. The UE may be configured to rate match at least a portion of the one or more S-SSBs to occupy a second quantity of RBs greater than the first quantity of RBs. In another aspect, a wireless communication method may include communicating a S-SSB configuration indicating one or more S-SSB slots, where each slot includes two or more S-SSB candidates. By providing multiple possible S-SSB candidates in each of the S-SSB slots, a network may allocate fewer S-SSB slots to the SL UEs, which may reduce overhead in the shared frequency bands.

According to one aspect of the present disclosure, a method of wireless communication performed by a wireless communication device may include: receiving a first configuration indicating sidelink (SL) synchronization communication resources; receiving a second configuration indicating a SL resource pool, the SL resource pool associated with a first subcarrier spacing (SCS); transmitting, based on the first configuration, a SL synchronization communication based on a second SCS larger than the first SCS; and transmitting, based on the second configuration, a SL communication based on the first SCS.

According to another aspect of the present disclosure, a method of wireless communication performed by a wireless communication device may include receiving a first configuration indicating sidelink (SL) synchronization communication resources, wherein the SL synchronization communication resources comprise a first portion of a shared frequency band for a SL synchronization communication; and transmitting, based on the first configuration, the SL synchronization communication rate matched to occupy a second portion of the shared frequency band, the second portion of the shared frequency band being larger than the first portion of the shared frequency band and including the first portion of the shared frequency band.

A wireless communication device, comprising: a transceiver; a memory device; and a processor in communication with the transceiver and the memory device, wherein the wireless communication device is configured to: receive a first configuration indicating sidelink (SL) synchronization communication resources; receive a second configuration indicating a SL resource pool, the SL resource pool associated with a first subcarrier spacing (SCS); transmit, based on the first configuration, a SL synchronization communication based on a second SCS larger than the first SCS; and transmit, based on the second configuration, a SL communication based on the first SCS.

A wireless communication device, comprising: a transceiver; a memory device; and a processor in communication with the transceiver and the memory device, wherein the wireless communication device is configured to: receive a first configuration indicating sidelink (SL) synchronization communication resources, wherein the SL synchronization communication resources comprise a first portion of a shared frequency band for a SL synchronization communication; and transmit, based on the first configuration, the SL synchronization communication rate matched to occupy a second portion of the shared frequency band, the second portion of the shared frequency band being larger than the first portion of the shared frequency band and including the first portion of the shared frequency band.

A non-transitory, computer readable medium having program code recorded thereon, where in the program code comprises instructions executable by a processor of a wireless communication device to cause the wireless communication device to: receive a first configuration indicating sidelink (SL) synchronization communication resources; receive a second configuration indicating a SL resource pool, the SL resource pool associated with a first subcarrier spacing (SCS); transmit, based on the first configuration, a SL synchronization communication based on a second SCS larger than the first SCS; and transmit, based on the second configuration, a SL communication based on the first SCS.

A non-transitory, computer readable medium having program code recorded thereon, where in the program code comprises instructions executable by a processor of a wireless communication device to cause the wireless communication device to: receive a first configuration indicating sidelink (SL) synchronization communication resources, wherein the SL synchronization communication resources comprise a first portion of a shared frequency band for a SL synchronization communication; and transmit, based on the first configuration, the SL synchronization communication rate matched to occupy a second portion of the shared frequency band, the second portion of the shared frequency band being larger than the first portion of the shared frequency band and including the first portion of the shared frequency band.

A wireless communication device, comprising: means for receiving a first configuration indicating sidelink (SL) synchronization communication resources; means for receiving a second configuration indicating a SL resource pool, the SL resource pool associated with a first subcarrier spacing (SCS); means for transmitting, based on the first configuration, a SL synchronization communication based on a second SCS larger than the first SCS; and means for transmitting, based on the second configuration, a SL communication based on the first SCS.

A wireless communication device, comprising: means for receiving a first configuration indicating sidelink (SL) synchronization communication resources, wherein the SL synchronization communication resources comprise a first portion of a shared frequency band for a SL synchronization communication; and means for transmitting, based on the first configuration, the SL synchronization communication rate matched to occupy a second portion of the shared frequency band, the second portion of the shared frequency band being larger than the first portion of the shared frequency band and including the first portion of the shared frequency band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

FIG. 15 is a flowchart illustrating methods for communicating SL synchronization communications in shared frequency bands in accordance with one or more aspects of the present disclosure.

FIG. 16 is a flowchart illustrating methods for communicating SL synchronization communications in shared frequency bands in accordance with one or more aspects of the present disclosure.

DETAILED DESCRIPTION

Figure 1:
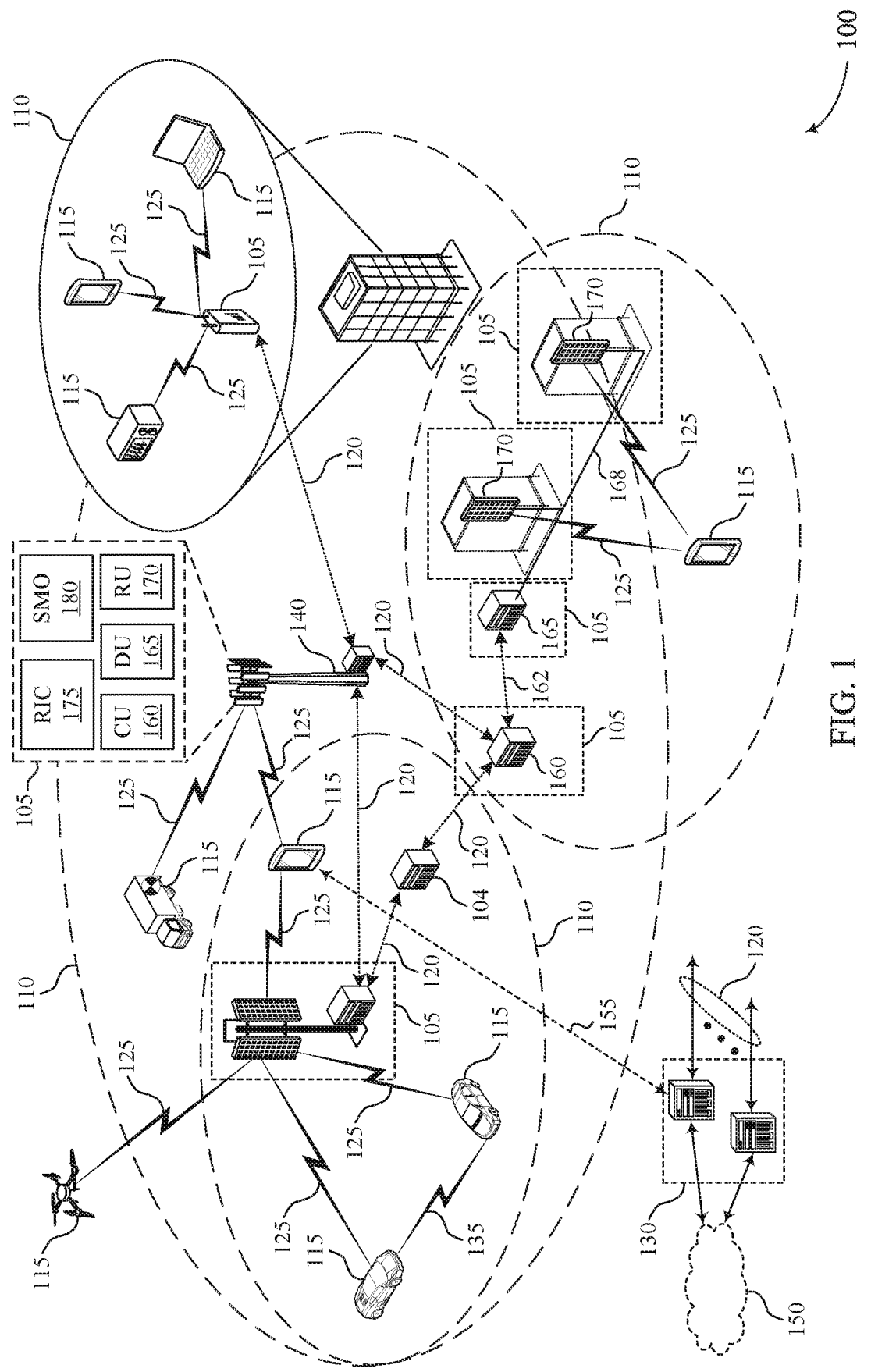
FIG. 1 illustrates an example of a wireless communications system that supports sidelink synchronization signal block (S-SSB) designs for shared spectrum in accordance with one or more aspects of the present disclosure.

Some wireless communications systems may support sidelink communications between user equipments (UEs). In some cases, a UE may communicate using one or more frequency bands associated with a shared radio frequency spectrum, which may be referred to as unlicensed radio frequency spectrum bands. The shared spectrum may include radio frequency bands, which may not be reserved, allocated, or licensed for specific use cases or specific radio access technologies (RATs). In such systems, a UE may perform a listen-before-talk (LBT) procedure to gain access to a sidelink bandwidth part (BWP) for a sidelink transmission. In some cases, the UE may use signaling that satisfies an occupied channel bandwidth (OCB) threshold associated with shared spectrum transmissions. In some cases, the OCB threshold for shared spectrum communications may be specified in a wireless communications standard. The OCB threshold may include a threshold percentage of a channel to be occupied or used for wireless communications (e.g., 80% of a 20 megahertz (MHz) channel).

In some cases, the UE may gain access to the sidelink BWP to transmit sidelink synchronization signal blocks (S-SSBs). The S-SSBs may allow other UEs to discover the UE and establish a sidelink connection with the UE for subsequent sidelink communications. In some examples, however, some waveforms for S-SSBs may not satisfy an OCB threshold for communications in the shared spectrum. For example, the UE may be unable to multiplex the S-SSB with other transmissions based on a waveform of the S-SSB, as the S-SSB waveform may be incompatible with a waveform of one or more sidelink channels (e.g., a physical sidelink control channel (PSCCH) waveform, a physical sidelink shared channel (PSSCH) waveform, or both). In some cases, the S-SSB waveform may be incompatible with one or more resource configurations (e.g., a sub-channel-based resource pool configuration). Accordingly, the UE may be unable to transmit an S-SSB while satisfying the OCB threshold.

In accordance with the techniques described herein, a UE may communicate S-SSBs using S-SSB resources such that the S-SSBs occupy a larger portion of shared frequency band than is indicated in a corresponding S-SSB configuration. For example, in some aspects, a UE may receive a S-SSB configuration indicating a S-SSB structure or configuration in the frequency domain and/or in the time domain. In some aspects, the S-SSB configuration may indicate a plurality of resource blocks (RBs), one or more S-SSB slots, and/or one or more symbols corresponding to one or more S-SSB candidate locations. In some aspects, the configured frequency resources for an S-SSB may occupy a first portion of the shared frequency band. The UE may be configured to transmit the S-SSB such that the S-SSB occupies a second portion of the shared frequency band, where the second portion is larger than the first portion indicated in the S-SSB configuration. In one example, the UE may expand the occupied bandwidth of an S-SSB by using a larger SCS than the SCS configured for the corresponding SL resource pool. In another example, the UE may expand the occupied bandwidth of the S-SSB by rate matching at least a portion of the S-SSB to occupy additional RBs in the frequency domain. In some aspects, the UE may transmit the S-SSB such that the S-SSB satisfies one or more of the OCB thresholds mentioned above. In another aspect, the UE may be configured with a plurality of S-SSB candidates in one or more S-SSB slots. The UE may be configured to determine or select at least one of the S-SSB candidates for transmitting one or more S-SSBs. In another aspect, the UE may be configured with a plurality of S-SSB candidates, where at least one S-SSB candidate is located in a S-SSB slot, and at least one S-SSB candidate is located in a SL resource pool. The UE may be configured to receive a signal activating one or more of the S-SSB candidates in the S-SSB slot and/or the at least one S-SSB candidate in the SL resource pool.

Aspects of the present disclosure provide a number of advantages. For example, by enabling UEs to communicate S-SSBs using expanded frequencies (e.g., by rate matching and/or by fixing SCS to a larger SCS value), the UE may satisfy one or more OCB requirements or thresholds without multiplexing incompatible SL signals and/or changing the S-SSB waveform. By occupying a greater amount of the resources in the shared frequency band, the amount of collisions and other errors in the shared frequency band may decrease. Further, by providing multiple configured S-SSB candidate locations in one or more S-SSB slots and/or one or more SL resource pools, the overhead of SL communications in the shared frequency band may decrease. Thus, power consumption may also decrease, which may improve the efficiency of SL communications in the shared frequency band.

Aspects of the disclosure are initially described in the context of wireless communications systems. Some aspects of the disclosure are further described with reference to resource configurations that enable the efficient transmission of S-SSBs. Aspects of the disclosure are further illustrated by and described with reference to apparatus diagrams, system diagrams, resource configurations, and flowcharts that relate to S-SSB designs for shared spectrum.

FIG. 1 illustrates an example of a wireless communications system 100 that supports S-SSB designs for shared spectrum in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A)

network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (RIC) 175 (e.g., a Near-Real Time RIC (Near-RT RIC), a Non-Real Time RIC (Non-RT RIC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 170 is flexible and may support different functionalities depending upon which functions (e.g., network layer functions, protocol layer functions, baseband functions, radio frequency functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (JAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (JAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support S-SSB designs for shared spectrum as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 170, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (of) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

A UE 115 attempting to access a wireless network may perform an initial cell search by detecting a primary synchronization signal (PSS) from a network entity 105 or from another UE 115. The PSS may enable synchronization of slot timing and may indicate a physical layer identity value. The UE 115 may then receive a secondary synchronization signal (SSS). The SSS may enable radio frame synchronization and may provide a cell identity value, which may be combined with the physical layer identity value to identify the cell. The SSS may also enable detection of a duplexing mode and a cyclic prefix length. Some systems, such as TDD systems, may transmit an SSS but not a PSS. Both the PSS and the SSS may be located, for example, in the central 62 and 72 subcarriers of a carrier, respectively. In some cases, a wireless device may transmit synchronization signals (e.g., PSS SSS, and the like) using multiple beams in a beam-sweeping manner. In some cases, PSS, SSS, and/or broadcast information (e.g., a physical broadcast channel (PBCH)) may be transmitted within different synchronization signal blocks (SSBs) on respective directional beams, where one or more SSBs may be included within a burst.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may include one or more UEs 115, which may communicate directly with other UEs 115 over a D2D communication link 135 (e.g., in accordance with a P2P, D2D, or sidelink protocol). In some cases, UEs 115 may communicate using one or more radio frequency bands associated with a shared spectrum (e.g., unlicensed radio frequency spectrum bands). In some cases, UEs 115 may configure one or more communication parameters to satisfy an OCB threshold, which may be specified in a wireless communications standard. However, some sidelink signaling may be unable to satisfy the OCB threshold.

The wireless communications system 100 may support an S-SSB waveform that is transparent to PSCCH, PSSCH, and other sidelink signals. In addition, the S-SSB waveform may enables a UE 115 to satisfy the OCB threshold when communicating in shared radio frequency spectrum bands. The UE 115 may transmit one or more S-SSBs using time-frequency resources that enable the UE 115 to multiplex the S-SSB with PSSCH signaling (e.g., in the frequency domain). In some cases, the UE 115 may simultaneously transmit the S-SSB and PSSCH signaling using TDM techniques, FDM techniques, or hybrid TDM-FDM techniques. The UE 115 may transmit the S-SSB using four symbols of a slot (e.g., a 14-symbol slot), which may be different from the first four symbols (e.g., an initial fours symbols) of the slot (e.g., to avoid time-frequency resources allocated for PSCCH and other signaling).

Figure 2:
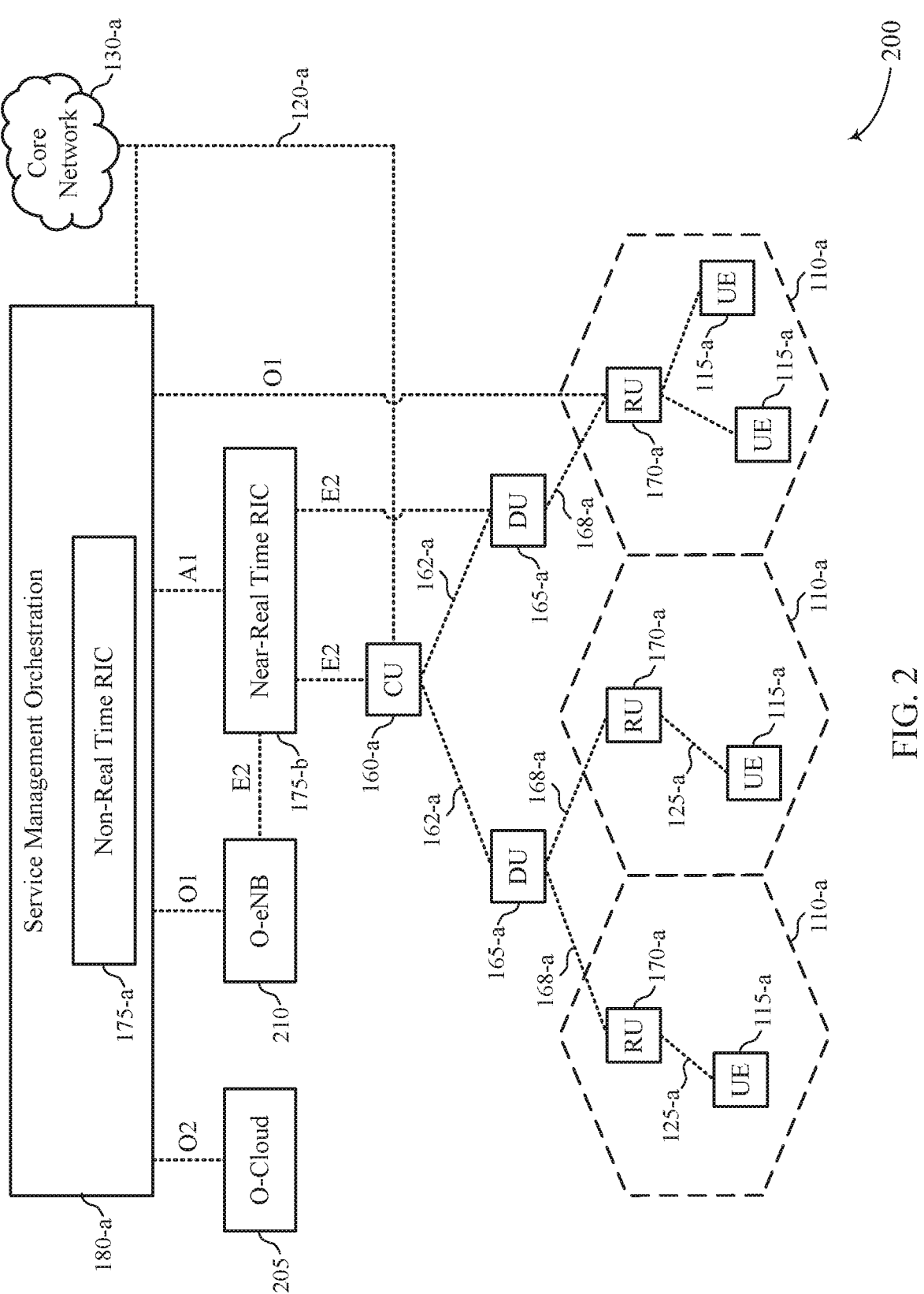
FIG. 2 illustrates an example of a network architecture that supports S-SSB designs for shared spectrum in accordance with one or more aspects of the present disclosure.

FIG. 2 illustrates an example of a network architecture 200 (e.g., a disaggregated base station architecture, a disaggregated RAN architecture) that supports S-SSB designs for shared spectrum in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface).

Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g. via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., AI policies).

Network architecture 200 may support UEs 115-*a* establishing access links and/or sidelinks. In some cases, a UE 115-*a* may establish an access link with a network entity 105 (e.g., CU 160-*a*, DU 165-*a*, RU 170-*a*, Non-RT RIC 175-*a*, Near-RT RIC 175-*b*, SMO 180-*a*, O-Cloud 205, O-eNB 210) and a sidelink (e.g., a sidelink communication link) with another UE 115-*a*. In some cases, a UE 115-*a* may establish an access link with a network entity 105 and may establish a sidelink with another UE 115-*a* which operates as a relay (e.g., which has an access link with the same or different network entity 105 as the UE 115-*a*) such that the UE 115-*a* may communicate with a network via either the access link, or the sidelink, or both. In some cases, UEs 115-*a* may use a sidelink to extend a coverage area 110-*a*. For example, a UE 115-*a* may establish a sidelink with another UE 115-*a* (e.g., a relay UE) having an access link with a network entity 105 for which the UE 115 is out of coverage.

In some cases, UEs 115-*a* may communicate using one or more radio frequency bands associated with a shared spectrum (e.g., unlicensed radio frequency spectrum bands). In some cases, UEs 115-*a* may use one or more parameters to satisfy an OCB threshold. However, some sidelink signaling may be unable to satisfy the OCB threshold. The network architecture 200 may support an S-SSB waveform that is transparent to PSCCH, PSSCH, and other sidelink signals, and the S-SSB waveform may enable a UE 115-*a* to satisfy the OCB threshold when communicating in shared radio frequency spectrum bands. The UE 115-*a* may transmit one or more S-SSBs using time-frequency resources that enable the UE 115-*a* to multiplex the S-SSB with PSSCH signaling (e.g., in the frequency domain). In particular, the S-SSBs transmitted by the UE 115-*a* may use a waveform such that one or more S-SSBs are transmitted using time-frequency resources that enable the UE to multiplex the S-SSBs with PSSCH signaling in a frequency domain. Here, the UE may transmit the S-SSBs using four symbols of a slot, and the S-SSBs may be sent using four symbols that are different from the first four symbols of the slot (e.g., to avoid time-frequency resources allocated for PSCCH signaling).

Figure 3:
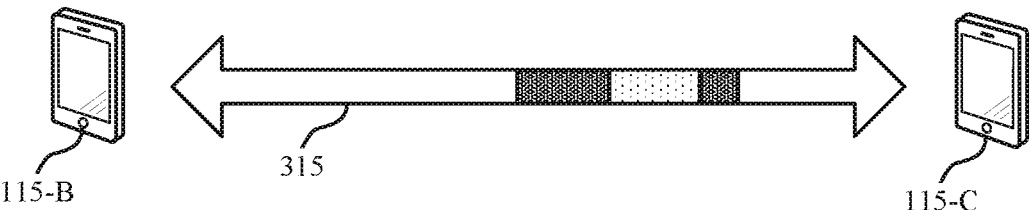
FIG. 3 illustrates an example of a wireless communications system that supports S-SSB designs for shared spectrum in accordance with one or more aspects of the present disclosure.
Figure 3:
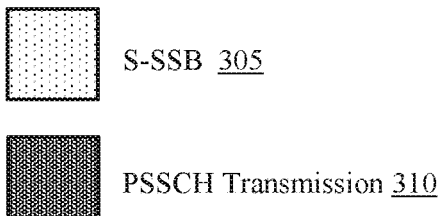

FIG. 3 illustrates an example of a wireless communications system 300 that supports S-SSB designs for shared spectrum in accordance with one or more aspects of the present disclosure. The wireless communications system 300 may implement aspects of the wireless communications system 100. For example, the wireless communications system 300 may include a UE 115-*b* and a UE 115-*c*, which may be examples of corresponding UEs 115 as described with reference to FIG. 1. The wireless communications system 300 may support the use of an S-SSB waveform that may be multiplexed with PSCCH/PSSCH in a same subchannel (e.g., a 20 MHz subchannel) in a slot, and the S-SSB waveform may avoid impact on PSCCH decoding while also avoiding resources configured for DMRS and SCI (e.g., SCI-2).

Wireless communications system 300 may be an example of a 5G NR system, and may support wireless devices establishing an access link (e.g., a Uu interface) and/or a sidelink (e.g., a PC5 interface). For example, a UE 115 may establish an access link with a network entity 105 and a sidelink (e.g., a sidelink communication link) with another UE 115. In some cases, a UE 115 may establish an access link with a network entity 105 and may establish a sidelink with another UE 115 which operates as a relay (e.g., which has an access link with the same or different network entity 105 as the UE 115) such that the UE 115 may communicate with a network via either the access link, or the sidelink, or both. In some cases, devices may use a sidelink to extend a coverage area. For example, a UE 115 may establish a sidelink with another UE 115 (e.g., a relay UE) having an access link with a network entity 105 for which the UE 115 is out of coverage. Sidelink communications may be referred to as vehicle-to-vehicle (V2V) communications, vehicle-to-everything (V2X) communications, D2D communications, or other terminology.

The wireless communication system 300 may include a communication link 315, which may be an example of a sidelink (e.g., a D2D communication link 135) as described with reference to FIG. 1. The UE 115-*b* may transmit information to the UE 115-*c*, and the UE 115-*c* may similarly transmit information to the UE 115-*b*, over the sidelink. As an example, the UE 115-*b* may transmit a PSSCH transmission 310 and/or one or more S-SSBs 305 to the UE 115-*c*. In some cases, the UE 115-*b* may transmit using time-frequency resources, which may not be synchronous with the operation of the UE 115-*c*. For example, the UE 115-*b* may transmit a PSSCH transmission 310 using a first slot, and the UE 115-*c* may be unaware of the slot boundary to be used for receiving the PSSCH transmission 310. As such, the UE 115-*b* may transmit (e.g., periodically) one or more S-SSBs 305, which may facilitate synchronization of communications between multiple UEs 115. The UE 115-*c* may receive the S-SSB 305 and perform one or more operations to synchronize time-frequency resources with the UE 115-*b*. In some cases, the S-SSB 305 may include a PSS and an SSS. A UE 115 may transmit the S-SSB 305 using multicast, groupcast, or broadcast signaling.

The wireless communications system 300 may support sidelink communications in shared radio frequency spectrum bands (e.g., unlicensed radio frequency spectrum bands), which may not be reserved, allocated, or licensed for specific use cases or specific RATs. For example, the UE 115-b may transmit the PSSCH transmission 310 to the UE 115-c using one or more unlicensed radio frequency bands. The UE 115-b may perform one or more channel access procedures to gain access to the one or more unlicensed frequency bands. As an example, a UE 115 may communicate using time-frequency resources after gaining access to a channel using one or more channel access techniques (e.g., LBT) to reserve resources for transmitting a signal. Upon gaining access to the shared spectrum, the UE 115-b may transmit signaling using a number of symbol periods (e.g., OFDM symbol periods) within a slot, which may be an example of a TTI.

The shared spectrum may be associated with one or more conditions for spectrum usage. In some cases, a condition for shared spectrum usage may be associated with an OCB. An OCB may be defined as a bandwidth that contains a portion (e.g., 99%) of a total signal power. For example, a UE 115 may transmit a signal with a nominal bandwidth. However, the signal (e.g., the measured signal) may occupy a portion of the nominal bandwidth (e.g., due to variations in signal power). In some cases, the OCB may be smaller than the nominal bandwidth.

A condition for shared spectrum usage may include a threshold associated with an OCB. For example, a wireless communication standard may specify a threshold percentage of a total signal power for a respective channel, which may be referred to herein as a "threshold OCB" or an "OCB threshold." In some other cases, a wireless communication standard may specify a threshold percentage of a total signal power, a threshold bandwidth, or both. The wireless communications system 300 may support one or more OCB thresholds for shared spectrum communications to reduce a percentage of a signal's bandwidth that is outside of a bandwidth allocated for communications between UEs 115 (e.g., to reduce interference and enable fairness to other transmitting devices in the system). An OCB threshold may be expressed as a minimum percentage of a nominal channel bandwidth to be occupied. For example, a wireless communications standard may specify that an OCB is larger than 80% of a respective nominal channel bandwidth.

In some cases, transmission may be multiplexed to increase an OCB. For example, for non-sidelink transmissions, an SSB may be multiplexed in the downlink with one or more other transmissions, such as channel state information reference signal (CSI-RS) transmissions, remaining minimum system information (RMSI) transmissions, physical downlink control channel (PDCCH) transmissions, physical downlink shared channel (PDSCH) transmission, and other transmission types (e.g., non-unicast transmissions). In some cases, however, a UE 115 may be unable to meet a minimum OCB threshold, such as for some transmissions of an S-SSB. For example, the UE 115-b may be unable to transmit S-SSB to the UE 115-c while satisfying the OCB threshold.

In particular, the UE 115-b may use some techniques for transmitting S-SSBs in accordance with a configuration of the S-SSB such that the S-SSB occupies a full slot and. Here, the UE 115-b may be unable to multiplex the S-SSB with other transmissions because the S-SSB structure (e.g., waveform) may not match a resource pool structure associated with other transmission types (e.g., a resource pool structure for PSCCH and PSSCH transmissions). Further, the S-SSB may be incompatible with one or more resource configurations (e.g., a sub-channel-based resource pool configuration). For instance, a resource pool for the S-SSB may not overlap with a resource pool for other transmissions.

Accordingly, the UE 115 may be unable to transmit the S-SSB while satisfying an OCB threshold. As an illustrative example, the UE 115-b may transmit an S-SSB using a slot (e.g., 14 symbols including a gap symbol), where the S-SSB may occupy 11 resource blocks RBs of a BWP. The slot used for the S-SSB, however, may not be used for other message types, such as PSSCH transmissions 310. An OCB threshold may not be satisfied when no other signals are transmitted in the slot along with the S-SSBs, and some S-SSB transmissions may thus not occupy more than 80% of a respective nominal channel bandwidth.

In accordance with the techniques described herein, a UE 115 may transmit one or more S-SSBs 305, which may be multiplexed with PSCCH/PSSCH in a same subchannel (20 MHz subchannel) in a TTI (e.g., a slot). For example, the UE 115 may transmit one or more S-SSBs 305 using a portion of a slot and avoiding time-frequency resources for other transmission types, such as PSCCH transmissions, AGC symbols, DMRS transmissions, and other transmission types. The UE 115 may transmit an S-SSB 305 using four symbol periods that follow the first four symbol periods of the slot. Put another way, the four symbol periods for the S-SSB transmission may be different from an initial four symbols of the slot. In some cases, the UE 115 may transmit the one or more S-SSBs using a waveform configuration, which may enable the UE 115 to multiplex (e.g., FDM or TDM) the S-SSB with other transmissions (e.g., PSSCH transmissions). Accordingly, the UE 115 may configure one or more waveform parameters for the S-SSB to increase an OCB and satisfy an OCB threshold.

Figure 4:
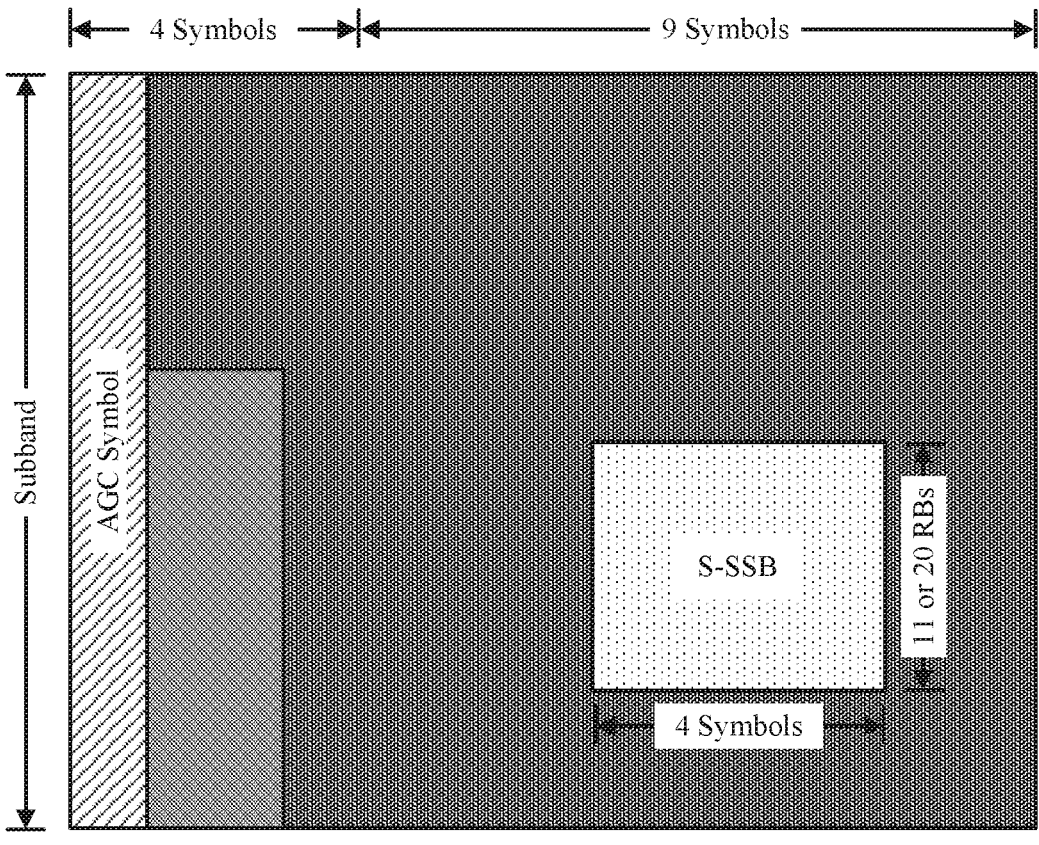
FIG. 4 illustrates an example of a resource configuration that supports S-SSB designs for shared spectrum in accordance with one or more aspects of the present disclosure.
Figure 4:
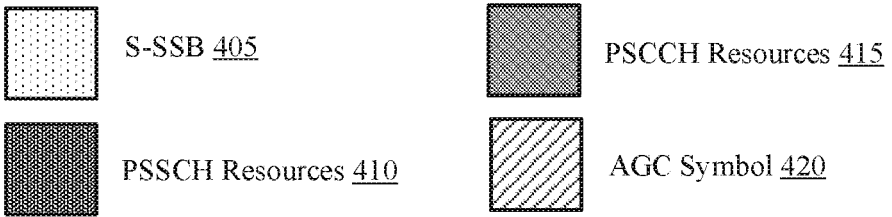

FIG. 4 illustrates an example of a resource configuration 400 that supports S-SSB designs for shared spectrum in accordance with one or more aspects of the present disclosure. The resource configuration 400 may be implemented by aspects of the wireless communications system 100 and the wireless communications system 300. For example, the resource configuration 400 may be implemented for sidelink communications by one or more UEs, such as described by the wireless communications system 300. The resource configuration 400 may support the use of an S-SSB waveform that may be multiplexed with PSCCH/PSSCH in a same subchannel (e.g., 20 MHz subchannel) in a slot, and the S-SSB waveform may not have an impact on PSCCH decoding while also avoiding resources configured for DMRS and SCI (e.g., SCI-2).

The resource configuration 400 may include time-frequency resources for one or more transmission types. For example, the resource configuration 400 may include time-frequency resources for an S-SSB 405. In some cases, a UE 115 may transmit one or more S-SSBs 405. The resource configuration 400 may be a representation of time-frequency resources, transmissions using time-frequency resources, or both. For example, S-SSB 405 may be an example of a transmission or time-frequency resources for the transmission.

As described herein, a UE 115 may multiplex an S-SSB 405 with PSSCH resources 410. For example, a portion of PSSCH resources 410 may overlap with the S-SSB 405. The UE 115 may multiplex the S-SSB 405 with the PSSCH resources 410 to satisfy an OCB threshold, where the multiplexed signaling may fill 80% of a 20 MHz channel. The UE 115 may transmit the S-SSB 405 using a quantity of symbols and a quantity of RBs. For example, the UE 115 may transmit the S-SSB 405 using 4 symbols and 11 RBs. In some other cases, the UE 115 may transmit the S-SSB 405 using 4 symbols and 20 RBs. The UE 115 may select time-frequency resources for the S-SSB 405 that do not overlap with a quantity of time-frequency resources that are configured for other types of signaling. For example, the UE 115 may select four symbols for transmitting the S-SSB 405, which may be different from an initial four symbols of a slot.

In some cases, the UE 115 may select one or more time-frequency resources for the S-SSB 405 to avoid one or more time-frequency resources for other transmissions. For example, the UE 115 may select one or more time-frequency resources for the S-SSB 405, which may be different from PSCCH resources 415. Additionally, or alternatively, the UE 115 may select one or more time-frequency resources for the S-SSB 405, which may be different from an AGC symbol 420. In some cases, the AGC symbol 420 may span a sub-band. In some cases, PSCCH resources 415 may span a portion of a sub-band. Additionally, or alternatively, the S-SSB 405 may span a portion of a sub-band. In some cases, the UE 115 may select one or more time-frequency resources for the S-SSB 405, which may be different from PSCCH resource 415, so that PSCCH decoding is not impacted by the S-SSB 405.

In some cases, the UE 115 may multiplex the S-SSB 405 and PSSCH resources 410 within a sub-band. For example, the S-SSB 405 and the PSSCH resources 410 may be included in a single sub-band, which may be an example of a 20 MHz subchannel. Additionally, or alternatively, the sub-band (e.g., subchannel) may include the AGC Symbol 420 and the PSCCH resources 415. The sub-band may be an example of a sub-band or a channel of an unlicensed frequency spectrum (e.g., a shared spectrum). In some other cases, the sub-band may be an example of a sub-band or a channel of a licensed frequency spectrum.

The UE 115 may transmit control signaling, which may indicate one or more time-frequency resources associated with the S-SSB 405 (e.g., a location of the S-SSB 405). For example, the UE 115 may transmit an SCI message, which may indicate a sub-band for the S-SSB 405. In some cases, the SCI message may indicate one or more symbols for the S-SSB 405. Additionally, or alternatively, the SCI message may indicate one or more slots for the S-SSB 405. In some cases, the SCI message may be an SCI-1 message. In some cases, the UE 115 may transmit an indication of one or more RBs for the SSB-405 via master information block (MIB) signaling, RMSI signaling, RRC signaling, or any combination thereof.

In some cases, a UE 115 may perform one or more rate matching operations associated with the S-SSB 405. For example, the UE 115 may rate match PSCCH resources 415 around the S-SSB 405. In some cases, the UE 115 may rate match any combination of PSCCH resources 415, SCI (e.g., SCI-2), and DMRS resources around the S-SSB 405. In some cases, the UE 115 may transmit an SCI message, which may include a bit indicating if the S-SSB 405 is included in a sub-band. A UE 115 may receive the SCI message and determining if one or more rate matching operations is associated with the S-SSB 405 based on based on the bit indicating if the S-SSB 405 is included in the sub-band.

Although FIG. 4 shows a particular location of the S-SSB 405, the S-SSB 405 may be located at a variety of other locations. For example, a UE 115 may transmit the S-SSB 405 using any four symbols that are different from a sequentially first four symbols of a slot. The four symbols may be contiguous symbols. In some cases, a slot may include 14 symbols (e.g., 13 symbols and a gap symbol). A UE 115 may transmit the S-SSB 405 using symbols five through eight of the slot. Additionally, or alternatively, the UE 115 may transmit the S-SSB 405 using symbols ten through thirteen.

Similarly, the UE 115 may transmit the S-SSB 405 using any combination of 11 or 20 RBs within the sub-band. The 11 or 20 RBs may be contiguous RBs.

In some cases, the UE 115 may transmit wideband signaling, which may include multiple sub-bands. In some cases, the UE 115 may transmit the S-SSB 405 using one or more sub-bands of a plurality of sub-bands (e.g., one or more sub-bands of a wideband transmission). In such cases, the UE 115 may transmit control information (e.g., an SCI-1 message) within the PSCCH resources 415, and the control information may indicate which one or more sub-bands of the plurality of sub-bands includes the S-SSB 405. In some cases, the control information may indicate the one or more sub-bands of the plurality of sub-bands if the S-SSB 405 is dynamic. In some cases, the control information may include a bitmap, which may indicate the one or more sub-bands including the S-SSB 405. The bitmap may include a first bit, which may indicate the leading sub-band containing the control information (e.g., the SCI-1). Additionally, or alternatively, the bitmap may include a second bit, which may indicate an additional sub-band (e.g., a subsequent sub-band) containing the control information. In some cases, the wideband signaling may include four or five sub-bands. In some other cases, the wideband signaling may include less than four sub-bands or greater than five sub-bands.

A UE 115 may transmit the S-SSB 405 using one sub-band. In such cases, the UE 115 may transmit a message including a sub-band index field, which may indicate which sub-band includes the S-SSB 405. A value of the sub-band index field may indicate the absence of the S-SSB 405 in a slot (e.g., in a slot of one or more sub-bands that do not include an S-SSB 405). In some cases, the sub-band index may be a relative index. In some cases, the control information carrying sub-band may be associated with a modulo operation. Additionally, or alternatively, the sub-band index may be an absolute index (e.g., within a four sub-band grid or a five sub-band grid). In some cases, a UE 115 may transmit the S-SSB 405 using a same sub-band including SCI (e.g., SCI-1). In such cases, a bit (e.g., a single bit) may indicate which sub-band includes the S-SSB 405 (e.g., the same sub-band in which the SCI was received).

Figure 5:
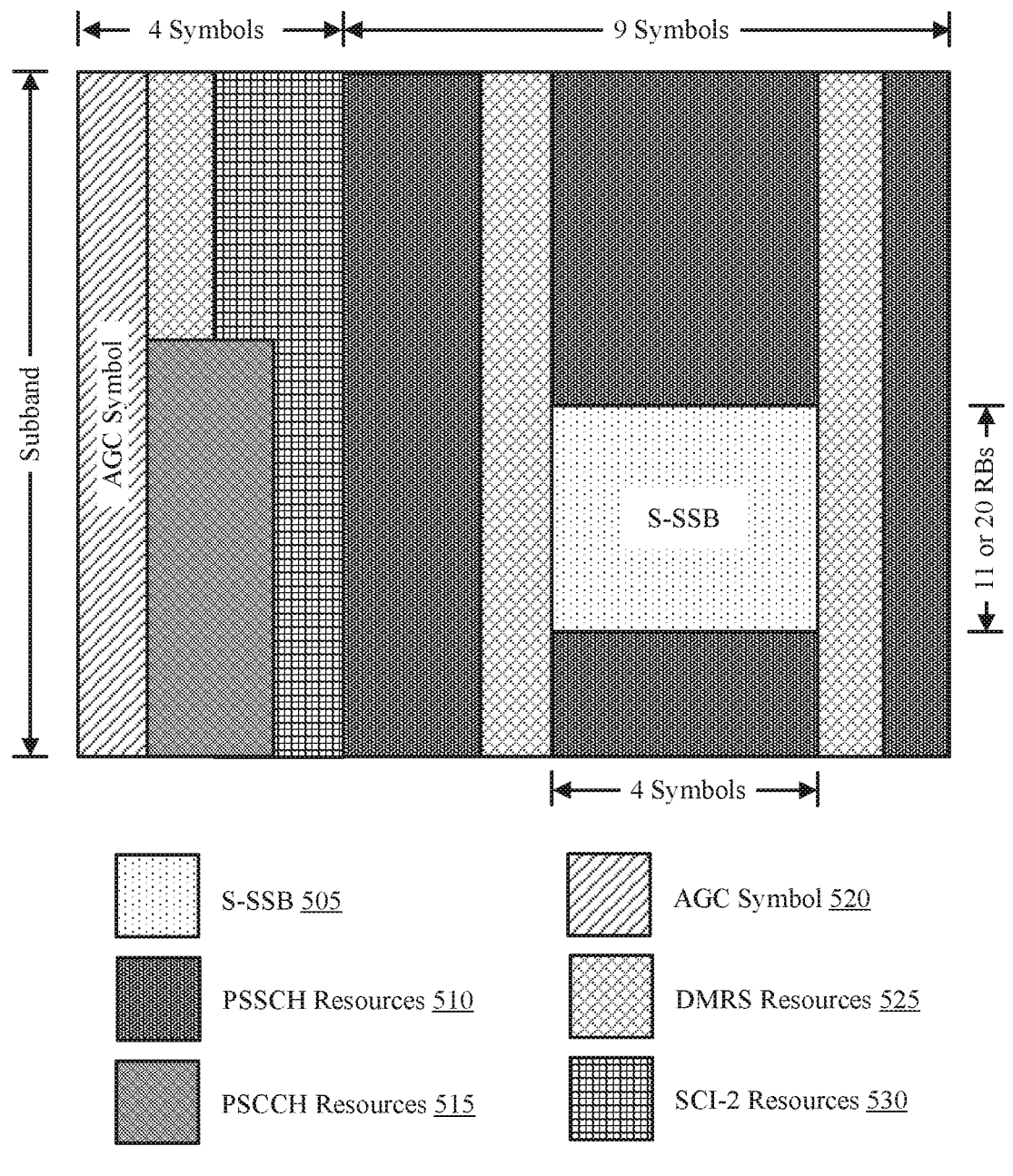
FIG. 5 illustrates an example of a resource configuration that supports S-SSB designs for shared spectrum in accordance with one or more aspects of the present disclosure.

FIG. 5 illustrates an example of a resource configuration 500 that supports S-SSB designs for shared spectrum in accordance with one or more aspects of the present disclosure. The resource configuration 500 may be implemented by aspects of the wireless communications system 100 and the wireless communications system 300. For example, the resource configuration 500 may be implemented for sidelink communications by one or more UEs, such as described by the wireless communications system 300. The resource configuration 500 may support the use of an S-SSB waveform that may be multiplexed with PSCCH/PSSCH in a same subchannel (e.g., 20 MHz subchannel) in a slot, and the S-SSB waveform may not have an impact on PSCCH decoding while also avoiding resources configured for DMRS and SCI (e.g., SCI-2).

The resource configuration 500 may include time-frequency resources for one or more transmission types. For example, the resource configuration 500 may include time-frequency resources for an S-SSB 505. In some cases, a UE 115, as described with reference to FIG. 1 may transmit one or more S-SSBs 505. In some cases, the resource configuration 500 may be a representation of time-frequency resources, transmissions using time-frequency resources, or both. For example, S-SSB 505 may be an example of a transmission or time-frequency resources for the transmission.

As described herein, a UE 115 may multiplex an S-SSB 505 with PSSCH resources 510. For example, a portion of PSSCH resources 510 may overlap with the S-SSB 505. In some cases, the UE 115 may multiplex the S-SSB 505 with the PSSCH resources 510 to satisfy an OCB threshold. For example, the multiplexed signaling may fill 80% of a 20 MHz channel. In some cases, the UE 115 may transmit the S-SSB 505 using a quantity of symbols and a quantity of RBs. For example, the UE 115 may transmit the S-SSB 505 using 4 symbols and 11 RBs. In some other cases, the UE 115 may transmit the S-SSB 505 using 4 symbols and 20 RBs. In some cases, the UE 115 may select time-frequency resources for the S-SSB 505 that do not overlap with a quantity of time-frequency resources for other signals transmitted in the slot (e.g., a TTI). For example, the UE 115 may select four symbols for transmitting the S-SSB 505, which may be different from an initial four symbols of a slot.

Additionally, or alternatively, the UE 115 may select one or more time-frequency resources for the S-SSB 505 to avoid one or more time-frequency resources for other transmissions. For example, the UE 115 may select one or more time-frequency resources for the S-SSB 505, which may be different from PSCCH resources 515, the AGC symbol 520, DMRS resources 525, and SCI-2 resources 530. In some cases, the UE 115 may select one or more time-frequency resources for the S-SSB 505, which may be different from PSCCH resource 515, so that PSCCH decoding is not impacted by the S-SSB 505. Additionally, or alternatively, the UE 115 may select one or more time-frequency resources for the S-SSB 505, which may be different from DMRS resources 525 and SCI-2 resources 530, so that DMRS and SCI-2 demodulation and decoding are not impacted by the presence of the S-SSB 505.

The UE 115 may transmit control signaling, which may indicate one or more time-frequency resources associated with the S-SSB 505 (e.g., a location of the S-SSB 505). For example, the UE 115 may transmit an SCI message within the PSCCH resources 515, which may indicate a sub-band for the S-SSB 505. In some cases, the SCI message may indicate one or more symbols for the S-SSB 505. Additionally, or alternatively, the SCI message may indicate one or more slots for the S-SSB 505. In some cases, the SCI message may be an SCI-2 message. In some cases, the UE 115 may transmit an indication of one or more RBs for the SSB-505 via master information block (MIB) signaling, RMSI signaling, RRC signaling, or any combination thereof.

A configuration (e.g., a waveform configuration) for the S-SSB 505 may be based on a configuration for DMRS resources 525 and a configuration for PSCCH resources 515. For example, a variety of time-frequency resources may be used for DMRSs and PSCCH signaling. As such, FIG. 5 may show one example of a configuration for DMRS resources 525 and PSCCH resources 515. In some cases, a location (e.g., a location with the resource configuration 500) of DMRS resources 525 may be different than the location shown in FIG. 5. Similarly, aa location (e.g., a location with the resource configuration 500) of PSCCH resources 515 may be different than the location shown in FIG. 5. Accordingly, a UE 115 may select time-frequency resources for the S-SSB 505, which may be different from a plurality of potential locations for PSCCH resources 515 and DMRS resources 525. That is, the UE 115 may select a location for the S-SSB 505 to avoid the S-SSB 505 overlapping with locations of time-frequency resources allocated for other uses, such as PSCCH resources 515, DMRS resources 525, SCI-2 resources 530, and time-frequency resources for an AGC symbol 520.

In some cases, a configuration for the S-SSB 505 may be based on one or more configurations for PSCCH resources 515 and DMRS resources 525. For example, a UE 115 may select a configuration for the S-SSB 505 to avoid the S-SSB 505 overlapping with PSCCH resources 515 and DMRS resources 525. In some cases, one or more S-SSB 505 configurations may be compatible with one or more configurations for PSCCH resources 515 and DMRS resources 525. Accordingly, the UE 115 may transmit control information (e.g., an SCI-1 message), which may indicate a configuration for PSCCH resources 515 and DMRS resources 525 that is compatible with the configuration for the S-SSB 505. In some cases, the UE 115 may select a configuration for PSCCH resources 515 and DMRS resources 525, which may include a plurality of DMRSs, which may improve one or more conditions associated with high UE 115 mobility (e.g., more DMRSs may reduce or eliminated unwanted effects associated with a doppler shift).

In some cases, a configuration for an S-SSB 505 may be based on a quantity of DMRS resources 525. For example, if DMRS resources 525 include three symbols, the S-SSB 505 may be located between the DMRS resources 525. In some cases, a configuration for an S-SSB 505 may be based on a location of DMRS resources 525. In some cases, an S-SSB 505 may be split. For example, resources for the S-SSB 505 may not be contiguous. In such cases, one or more DMRS resources 525 may be located between one or more S-SSB 505 resources. Additionally, or alternatively, an S-SSB 505 may include a one symbol gap in the middle of the S-SSB 505.

In some cases, a UE 115 may perform an LBT procedure to access BWP in the shared spectrum. The UE 115 may perform the LBT procedure before transmitting an S-SSB 505. For example, the UE 115 may perform the LBT procedure to reserve time-frequency resources for the S-SSB 505. In some cases, if PSSCH resources 510 are empty (e.g., the PSSCH resources 510 do not include data), there may be a time-frequency resource gap (e.g., one or more empty symbols) between resources for SCI (e.g., SCI-2 resources 530) and the S-SSB 505, and the UE 115 may perform an additional LBT procedure for the S-SSB 505. In some cases, a UE 115 may rate match SCI-2 resources 530 to fill a gap between PSCCH resources 515 (e.g., PSCCH resources 515, which may be empty) and the S-SSB 505. Accordingly, the UE 115 may not perform the additional LBT procedure for the S-SSB 505.

Figure 6:
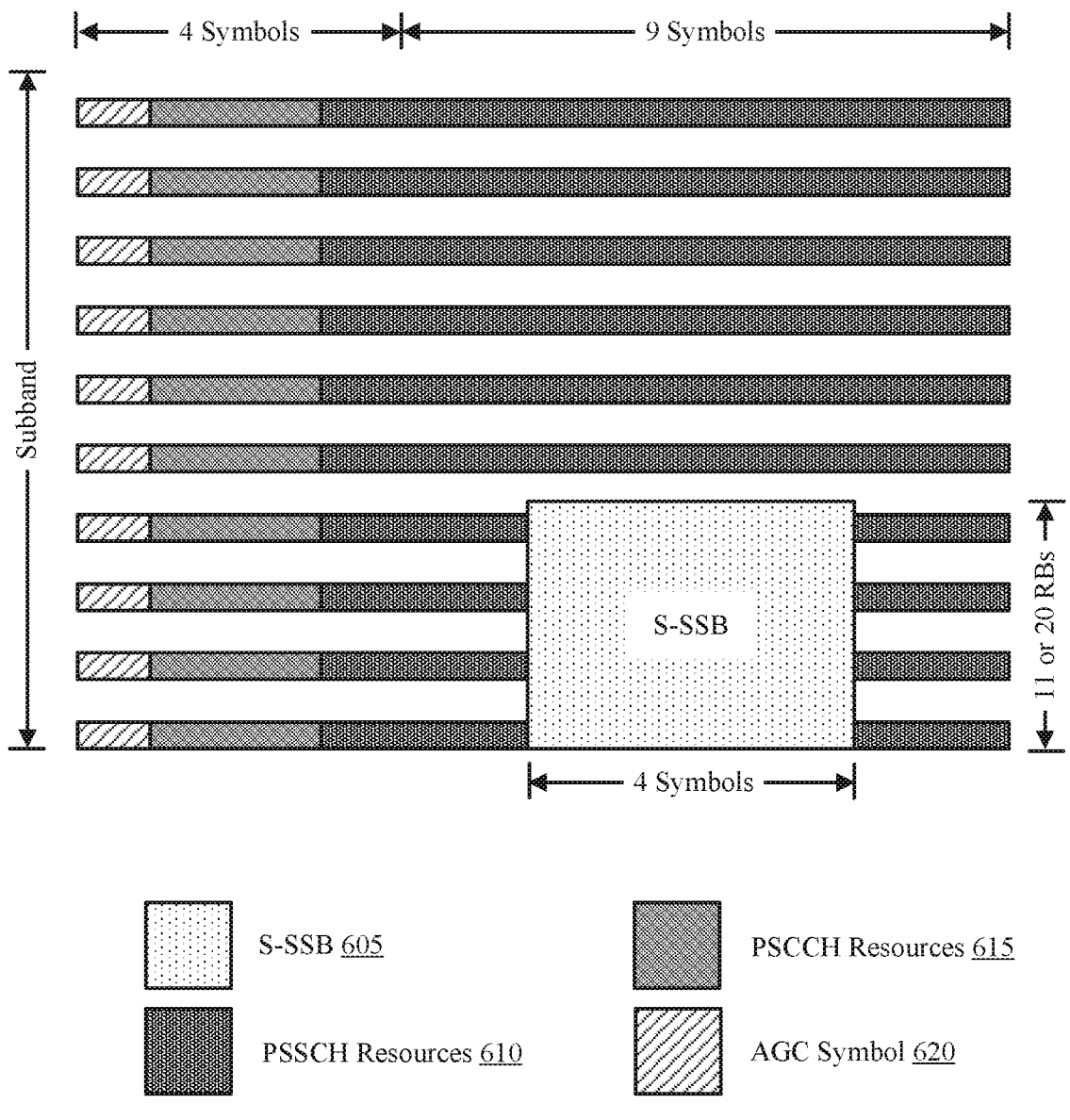
FIG. 6 illustrates an example of a resource configuration that supports S-SSB designs for shared spectrum in accordance with one or more aspects of the present disclosure.

FIG. 6 illustrates an example of a resource configuration 600 that supports S-SSB designs for shared spectrum in accordance with one or more aspects of the present disclosure. The resource configuration 600 may be implemented by aspects of the wireless communications system 100 and the wireless communications system 300. For example, the resource configuration 600 may be implemented for sidelink communications by one or more UEs, such as described by the wireless communications system 300. The resource configuration 600 may support the use of an S-SSB waveform that may be multiplexed with PSCCH/PSSCH in a same subchannel (e.g., 20 MHz subchannel) in a slot, and the S-SSB waveform may not have an impact on PSCCH decoding while also avoiding resources configured for DMRS and SCI (e.g., SCI-2).

The resource configuration 600 may include time-frequency resources for one or more transmission types. For example, the resource configuration 600 may include time-frequency resources for an S-SSB 605. In some cases, a UE 115, as described with reference to FIG. 1 may transmit one or more S-SSBs 605. In some cases, the resource configuration 600 may be a representation of time-frequency resources, transmissions using time-frequency resources, or both. For example, S-SSB 605 may be an example of a transmission or time-frequency resources for the transmission.

In some cases, a UE 115 may not be able to effectively maintain phase continuity. For example, some UEs 115 may be associated with high transmit power variation. In some cases, a UE 115 may multiplex an S-SSB 605 with a PSSCH transmission and a quantity of RBs may vary over time, which may have a negative effect on phase continuity. In some cases, the UE 115 may perform one or more operations to maintain phase continuity and limit transmit power variation. For example, a UE 115 may transmit signaling using an interlace waveform design to maintain phase continuity. In some cases, a UE 115 may communicate using interlaced PSSCH resources 610 and PSCCH resources 615. For example, the UE 115 may implement a full interlace waveform design.

As described herein, PSSCH resources 610, PSCCH resources 615, AGC symbol 620, or any combination thereof may be configured according to an interlace waveform design. An interlace waveform design may include a plurality non-contiguous RBs. The non-contiguous RBs may be separated by empty frequency resources (e.g., empty RBs). In some cases, PSSCH resources 610 may be configured according to an interlace waveform design. Similarly, PSCCH resources 615 and AGC symbol 620 may be configured according to an interlace waveform design. In some cases, for a full interlace waveform design, a quantity of RBs may be occupied for OFDM symbols with and without the S-SSB 605. Accordingly, phase continuity may be maintained. In some cases, if a UE 115 is capable of maintaining phase continuity, the UE 115 may communicate using a subset of interlaces.

In some cases, a total quantity of occupied RBs may vary over time, which may result in reduced phase continuity. For example, a first quantity of symbols may include PSSCH signaling, but may not include an S-SSB 605. A second quantity of symbols may include PSSCH signaling and the S-SSB 605. As a result, the second quantity of symbols may be associated with a higher transmit power than the first quantity of symbols. To improve phase continuity and reduce variation in transmit power, a UE 115 may adjust a transmit power for one or more transmissions to maintain a total transmit power. For example, the UE 115 may reduce a transmit power for PSSCH signaling corresponding to symbols that also include the S-SSB 605.

A UE 115 may adjust the transmit power for one or more transmissions by performing one or more operations. For example, the UE 115 may perform one or more operations to boost a transmit power associated with one or more transmissions. In some cases, the UE 115 may perform one or more operations to reduce a transmit power associated with one or more transmissions. Additionally, or alternatively, the UE 115 may set a transmit power for one or more transmissions to zero. In some cases, the UE 115 may adjust a transmit power by performing one or more puncturing operations. In some cases, puncturing one or more resources may refer to one or more resources having a zero transmit power. In some cases, the UE 115 may puncture one or more PSSCH resources 610 that overlap in time with the S-SSB 605 and power boost PSSCH signaling that does not overlap with the S-SSB 605 to maintain a total transmit power over a slot (e.g., the transmit power may not vary over a duration of the slot).

A UE 115 may determine to adjust a transmit power for one or more transmissions based on a quantity of interlaces. For example, a UE 115 may determine to adjust a transmit power for one or more PSSCH resources 610 based on a quantity of interlaces for the PSSCH resources 610. Additionally, or alternatively, the UE 115 may determine to adjust a transmit power for one or more transmissions based on a location of the S-SSB 605. In some cases, if a configuration for PSSCH resources 610 includes one or two interlaces, the UE 115 may puncture one or more PSSCH RBs that overlap in time with the S-SSB 605. Additionally, or alternatively, the UE 115 may increase transmit power (e.g., power boost) one or more PSSCH resources 610 that do not overlap in time with the S-SSB 605. Accordingly, by performing the operations described herein, the UE 115 may maintain a constant or near constant total transmit power for the duration of the slot (e.g., the 14 symbols of the slot).

In some cases, a quantity of RBs for the S-SSB 605 may be greater than a quantity of RBs for PSSCH resources 610 (e.g., if a configuration for PSSCH resources 610 includes a single interlace). In some cases, a quantity of RBs for the S-SSB 605 and a quantity of RBs for the PSSCH resources 610 may be a same quantity. For example, a configuration for PSSCH resources 610 may include two interlaces and a configuration for the S-SSB 605 may include 20 RBs. In some cases, if a configuration for PSSCH resources 610 includes more than two interlaces, the UE 115 may reduce a power associated with PSSCH resources 610 that overlap in time with the S-SSB 605.

In some cases, if PSSCH resources 610 are associated with quadrature phase shift keying (QPSK), a UE 115 receiving a transmission using the PSSCH resources 610 may be unable to determine that the power associated with PSSCH resources 610 has been reduced. In some cases, a UE 115 may multiplex one or more PSSCH transmissions with the S-SSB 605 and the one or more PSSCH transmissions may include a discovery signal, which may use QPSK to improve coverage. In some cases, if a UE 115 implements a higher order modulation for PSSCH resources 610, the UE 115 may calculate a transmit power de-boost, which may be associated with resource allocation for PSSCH resources 610. In some cases, a UE 115 may increase a transmit power associated with one or more PSSCH resources 610 based on a quantity of transmit power not allocated for the S-SSB 605.

Figure 7:
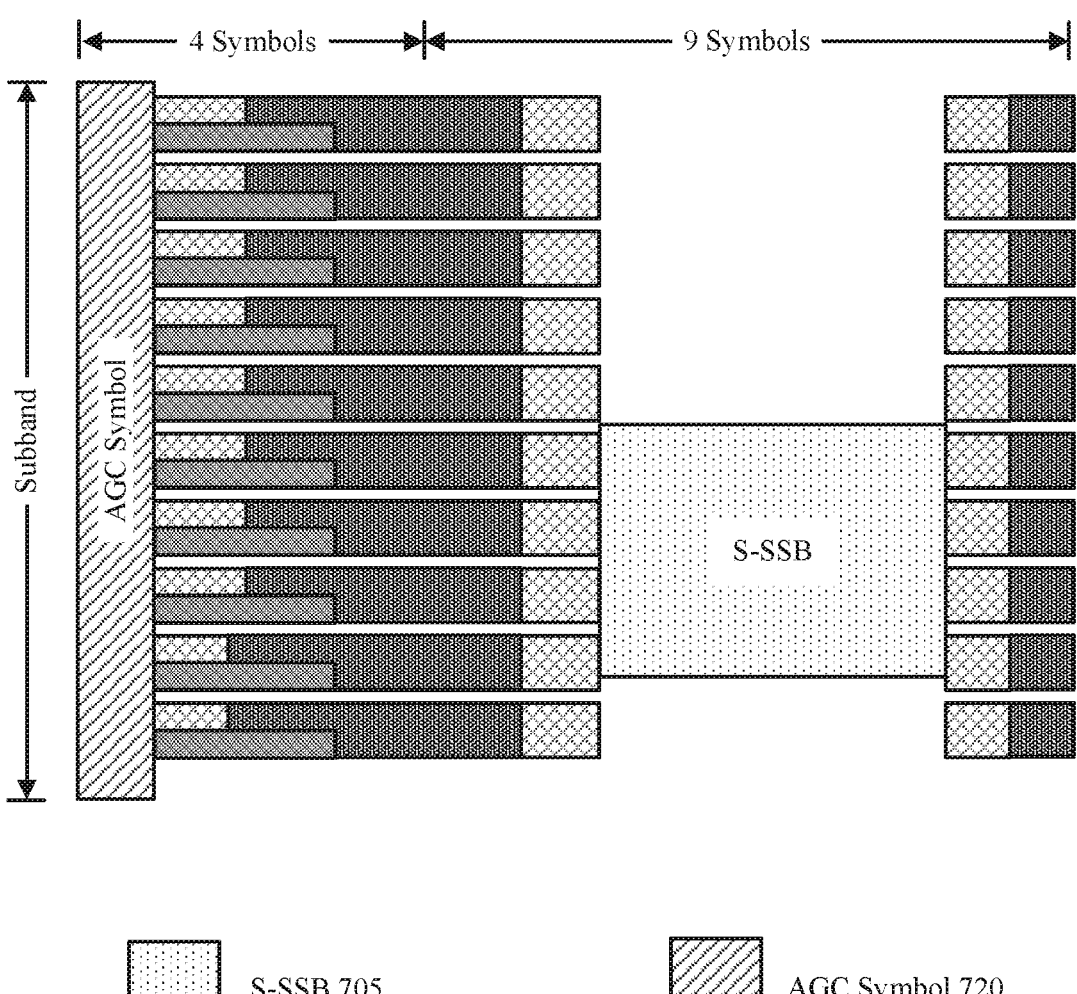
FIG. 7 illustrates an example of a resource configuration that supports S-SSB designs for shared spectrum in accordance with one or more aspects of the present disclosure.
Figure 7:
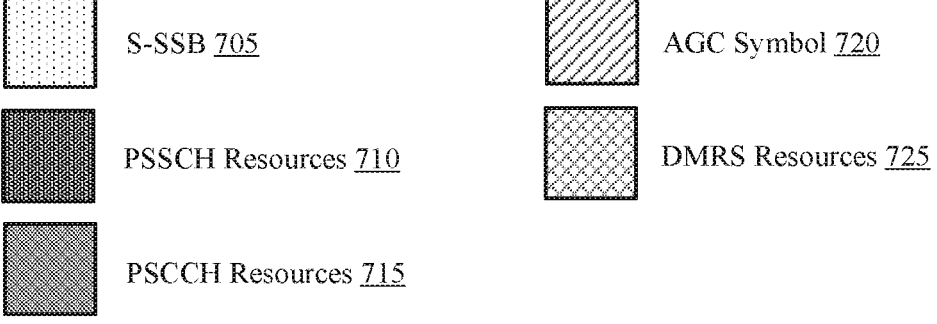

FIG. 7 illustrates an example of a resource configuration 700 that supports S-SSB designs for shared spectrum in accordance with one or more aspects of the present disclosure. The resource configuration 700 may be implemented by aspects of the wireless communications system 100 and the wireless communications system 300. For example, the resource configuration 700 may be implemented for sidelink communications by one or more UEs, such as described by the wireless communications system 300. The resource configuration 700 may support the use of an S-SSB waveform that may be multiplexed with PSCCH/PSSCH in a same subchannel (e.g., 20 MHz subchannel) in a slot, and the S-SSB waveform may not have an impact on PSCCH decoding while also avoiding resources configured for DMRS and SCI (e.g., SCI-2).

The resource configuration 700 may include time-frequency resources for one or more transmission types. For example, the resource configuration 700 may include time-frequency resources for an S-SSB 705. In some cases, a UE 115, as described with reference to FIG. 1 may transmit one or more S-SSBs 705. In some cases, the resource configuration 700 may be a representation of time-frequency resources, transmissions using time-frequency resources, or both. For example, S-SSB 705 may be an example of a transmission or time-frequency resources for the transmission.

In some cases, PSSCH resources 710, PSCCH resources 715, an AGC symbol 720, DMRS resources 725, or any combination thereof may be configured according to an interlace waveform design. An interlace waveform design may include a plurality non-contiguous RBs. The non-contiguous RBs may be separated by empty frequency resources (e.g., empty RBs). As described herein, an AGC symbol 720 may not be configured according to an interlace waveform design. However, PSSCH resources 710, PSCCH resources 715, and DMRS resources 725 may be configured according to an interlace waveform design. In some cases, the interlace waveform design may include one interlace. In some other cases, the interlace waveform design may include more than one interlace.

As described herein, a UE 115 may not be able to effectively maintain phase continuity or a constant transmit power for the duration of a slot. For example, a UE 115 may multiplex the S-SSB 705 with PSSCH resources 710, which may increase a total transmit power during symbols including the S-SSB 705. Additionally, or alternatively, a quantity of RBs may vary over a duration of a slot, which may have a negative effect on phase continuity. In some cases, the UE 115 may perform one or more operations to maintain phase continuity and limit transmit power variation. For example, a UE 115 may perform one or more rate matching operations around symbols for the S-SSB 705.

In some cases, a UE 115 may not multiplex the S-SSB 705 with one or more PSSCH resources 710 (e.g., one or more interlaced PSSCH resources 710). Accordingly, to maintain a constant or near constant total transmit power for a duration of a slot, the UE 115 may rate match around the S-SSB 705. Additionally, or alternatively, the UE 115 may increase or decrease a transmit power for PSSCH resources 710 to maintain a constant or near constant total transmit power for the duration of the slot.

As described herein, a UE 115 may use rate matching techniques. Rate matching may refer to matching a number of bits in a transport block (TB) from the MAC layer to a number of bits that may be transmitted in allocated resources of a physical channel. For example, rate matching may include sub-block interleaving, bit collection, and pruning. In some cases, a device may allocate resources of a channel to be excluded from, or not be a part of, the rate matching, which may in some cases be referred to as rate matching around a resource. For example, a UE 115 may configure resources to remain empty when rate matching information on to a channel. In some cases, the empty resources may have a zero transmit power. These empty resources may be referred to as rate-matched resources, rate-matching resources, rate-matched resource elements (REs), rate-matching REs, or some other terminology. Resources that have a zero transmit power may be referred to as punctured resources.

Figure 8:
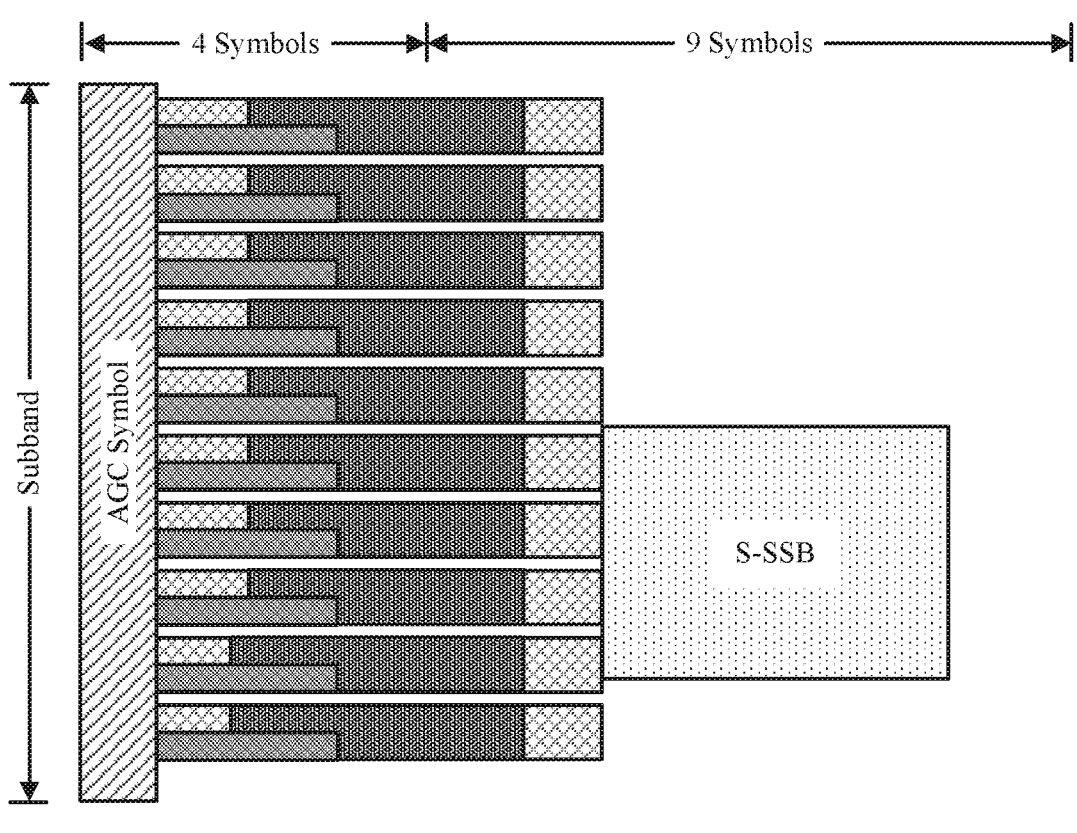
FIG. 8 illustrates an example of a resource configuration that supports S-SSB designs for shared spectrum in accordance with one or more aspects of the present disclosure.
Figure 8:
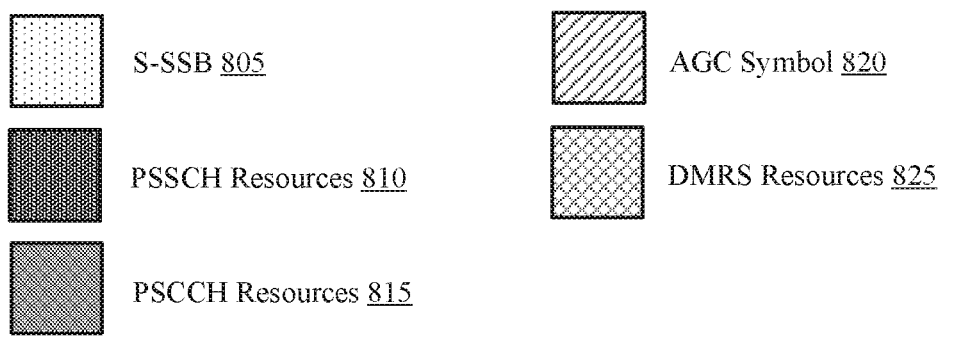

FIG. 8 illustrates an example of a resource configuration 800 that supports S-SSB designs for shared spectrum in accordance with one or more aspects of the present disclosure. The resource configuration 800 may be implemented by aspects of the wireless communications system 300 and the wireless communications system 100. For example, the resource configuration 800 may be implemented for sidelink communications by one or more UEs, such as described by the wireless communications system 300. The resource configuration 800 may support the use of an S-SSB waveform that may be multiplexed with PSCCH/PSSCH in a same subchannel (e.g., 20 MHz subchannel) in a slot, and the S-SSB waveform may not have an impact on PSCCH decoding while also avoiding resources configured for DMRS and SCI (e.g., SCI-2).

The resource configuration 800 may include time-frequency resources for one or more transmission types. For example, the resource configuration 800 may include time-frequency resources for an S-SSB 805. In some cases, a UE 115, as described with reference to FIG. 1 may transmit one or more S-SSBs 805. In some cases, the resource configuration 800 may be a representation of time-frequency resources, transmissions using time-frequency resources, or both. For example, S-SSB 805 may be an example of a transmission or time-frequency resources for the transmission.

In some cases, PSSCH resources 810, PSCCH resources 815, an AGC symbol 820, DMRS resources 825, or any combination thereof may be configured according to an interlace waveform design. An interlace waveform design may include a plurality non-contiguous RBs. The non-contiguous RBs may be separated by empty frequency resources (e.g., empty RBs). As described herein, an AGC symbol 820 may not be configured according to an interlace waveform design. However, PSSCH resources 810, PSCCH resources 815, and DMRS resources 825 may be configured according to an interlace waveform design. In some cases, the interlace waveform design may include one interlace. In some other cases, the interlace waveform design may include more than one interlace.

As described herein, a UE 115 may not be able to effectively maintain phase continuity or a constant transmit power for the duration of a slot. For example, a UE 115 may multiplex the S-SSB 805 with PSSCH resources 810, which may increase a total transmit power during symbols including the S-SSB 805. Additionally, or alternatively, a quantity of RBs may vary over a duration of a slot, which may have a negative effect on phase continuity. In some cases, the UE 115 may perform one or more operations to maintain phase continuity and limit transmit power variation. For example, a UE 115 may perform one or more rate matching operations around symbols for the S-SSB 805. However, in some cases, one or more symbols following the S-SSB 805 may be empty. For example, the one or more symbols following the S-SSB 805 may not include PSSCH resources 810 or DMRS resources 825.

In some cases, a UE 115 may not multiplex the S-SSB 805 with one or more PSSCH resources 810 (e.g., one or more interlaced PSSCH resources 810). Accordingly, to maintain a constant or near constant total transmit power for a duration of a slot, the UE 115 may rate match around the S-SSB 805. Additionally, or alternatively, the UE 115 may increase or decrease a transmit power for PSSCH resources 810 to maintain a constant or near constant total transmit power for the duration of the slot.

As described herein, a UE 115 may use rate matching techniques. Rate matching may refer to matching a number of bits in a TB from the MAC layer to a number of bits that may be transmitted in allocated resources of a physical channel. For example, rate matching may include sub-block interleaving, bit collection, and pruning. In some cases, a device may allocate resources of a channel to be excluded from, or not be a part of, the rate matching, which may in some cases be referred to as rate matching around a resource. For example, a UE 115 may configure resources to remain empty when rate matching information on to a channel. In some cases, the empty resources may have a zero transmit power. These empty resources may be referred to as rate-matched resources, rate-matching resources, rate-matched REs, rate-matching REs, or some other terminology. Resources that have a zero transmit power may be referred to as punctured resources.

In some cases, a UE 115 may configure a shortened waveform for the S-SSB 805. The shortened waveform may not include PSSCH resources 810 or DMRS resources 825 sequentially after the S-SSB 805. For example, one or more symbols before the S-SSB 805 may include PSSCH resources 810 and DMRS resources 825, however, one or more symbols following the S-SSB 805 may not include PSSCH resources 810 and DMRS resources 825. In some cases, the UE 115 may configure the waveform for the S-SSB 805 based on a size of a transport block. For example, if a transport block size is small, the UE 115 may determine to transmit one or more S-SSBs 805 using the shortened waveform. In some cases, SCI (e.g., SCI-1) may indicate if a UE 115 implements the shortened waveform. For example, a UE 115 may transmit an SCI-1 message, which may indicate that PSSCH resources 810 occurring before the S-SSB 805 are rate matched. In some cases (e.g., for waveform configurations that do not include full interlacing), a frequency domain resource allocation (FDRA) may implicitly indicate that aa UE 115 may implement the shortened waveform.

In some aspects, a UE may be configured with SL SSB resources that may not be multiplexed with other signals and/or SL data. For example, a UE may be configured with a plurality of S-SSB slots for communicating one or more S-SSBs in a shared frequency band. Further, the UE may be configured with a set of frequency resources within the one or more slots for communicating the one or more S-SSBs. In some aspects, the frequency resources allocated for the S-SSBs may not satisfy one or more channel occupancy thresholds or requirements for the shared frequency bands. For example, in some aspects, the frequency resources allocated for an S-SSB may be equal to or less than a 2 MHz threshold. The 2 MHz threshold may be associated with a channel occupancy requirement for communications in shared frequency bands. In some aspects, the bandwidth of the S-SSB resources may be based, in part, on the subcarrier spacing (SCS) of the allocated frequency band for SL communications. In another example, the frequency resources for the S-SSB communications may not satisfy an occupied channel bandwidth threshold of 80% of the total allocated bandwidth. However, it may not be practicable or desirable to multiplex the S-SSB with other SL communications in the frequency domain. The present disclosure describes systems, schemes, and mechanisms for communicating SL synchronization communications in a shared frequency band. Aspects of the present disclosure may increase the occupied bandwidth of an SL synchronization communication relative to the configured or allocated frequency resources for the SL synchronization communications.

Figure 9:
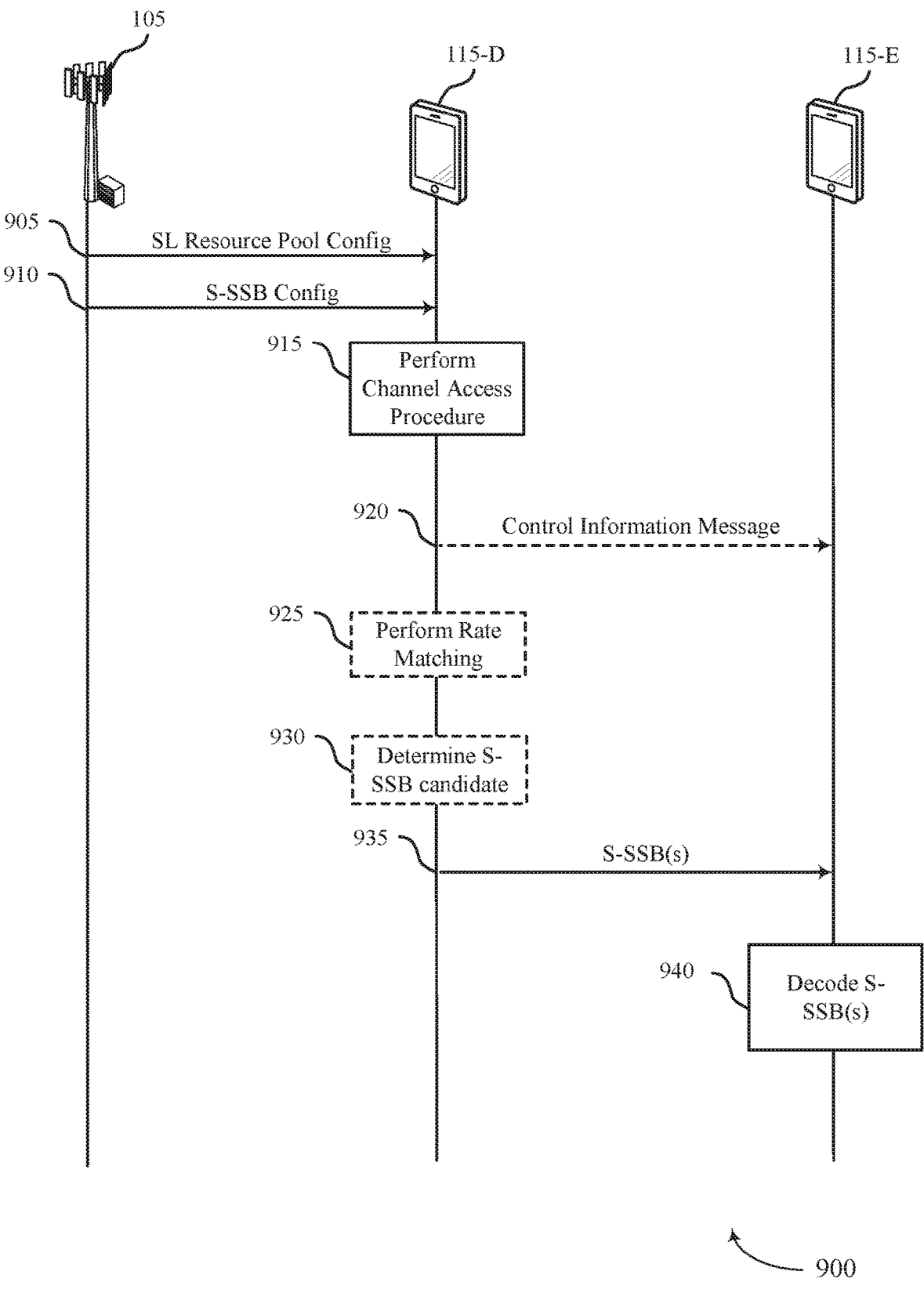
FIG. 9 illustrates an example of a process flow in a system that supports S-SSB designs for shared spectrum in accordance with one or more aspects of the present disclosure.

FIG. 9 illustrates an example of a process flow 900 in a system that supports S-SSB designs for shared spectrum in accordance with one or more aspects of the present disclosure. In some examples, process flow 900 may implement aspects of the wireless communications system 100 and the wireless communications system 300. For example, process flow 900 may include a UE 115-*d* and a UE 115-*e*, which may be examples of a corresponding UEs 115 as described with reference to FIGS. 1 and 3. The process flow 900 may further include a network device or network entity 105. In some aspects, the network entity 105 may include a base station (BS). The BS may be an aggregated BS or a disaggregated BS. For example, the UEs 115-D, 115-E may be configured to operate using SL resource allocation mode 1 in which the network provides, via the network entity 105, SL resource assignments or resource pools. In another example, the UEs 115-D, 115-E may be configured to operate using resource allocation mode 2 in which the UEs 115 may determine or select SL resources for communicating. In some cases, process flow 900 may implement aspects of resource configurations 400, 500, 600, 700, and 800 described above. Further, aspects of the process flow 900 are illustrated in FIGS. 10-12C and described below. Further, it will be understood that the process flow 900 may involve or incorporate a combination of aspects of the resource configurations 400-800 as well as the resource configurations 1000-1200*c*.

In the following description of process flow 900, the operations between the network entity 105, UE 115-D, and the UE 115-E may be transmitted in a different order than the order shown, or the operations may be performed at different times. Some operations may also be left out of process flow 900, or other operations may be added to process flow 900. While the UEs 115 are shown performing a number of the operations of process flow 900, any wireless device may perform the operations shown.

At 905, the network entity 105 transmits, and the UE 115-*d* may receive, a SL resource pool configuration. In some aspects, the resource pool configuration may indicate SL resources in a shared frequency band. The SL resource pool may be associated with a first SCS. In some aspects, receiving the second configuration may include receiving a SL-ResourcePool IE. For example, the SL resource pool may include time and frequency resources for SL data, SL control information, SL feedback information, and/or SL reference signals. In some aspects, the SL resource pool may include physical sidelink control channel (PSCCH) resources, physical sidelink shared channel (PSSCH) resources, physical sidelink feedback channel (PSFCH) resources, and/or any other suitable resources. The SL resource pool may include a subset of resources allocated for at least one S-SSB candidate, as shown in FIGS. 7 and 8, for example. Accordingly, the resources allocated for SL synchronization communications may include a combination of S-SSB slots and SL resource pool resources.

In some aspects, the SL-ResourcePool IE may indicate a SL synchronization resource configuration described below. The SL resource pool may include a bandwidth in the shared frequency band. For example, the bandwidth indicated in the SL resource pool may include a plurality of RBs, such as, for example, 11 RBs, 18 RBs, 24 RBs, 25 RBs, 38 RBs, 51 RBs, 52 RBs, 65 RBs, 106 RBs, and/or any other suitable number of RBs. The bandwidth of the SL resources may be 5 MHz, 10 MHz, 15 MHz, 20 MHz, 25 MHz, 30 MHz, 40 MHz, 50 MHz, 60 MHz, 80 MHz, 100 MHz, and/or any other suitable bandwidth. In some aspects, the SCS may be based on the frequency range of the SL resource pool.

At 910, the network entity 105 transmits, and the UE 115-D receives, a S-SSB configuration. In some aspects, receiving the S-SSB configuration may include receiving one or more radio resource control (RRC) messages or information elements indicating one or more parameters for the S-SSB resources. In some aspects, the S-SSB resources may include time-frequency resources for communicating one or more S-SSBs. In some aspects, the S-SSB resources may include one or more slots and/or one or more symbols in the time domain. In some aspects, the S-SSB resources may include one or more SL synchronization communication candidates or instances. For example, the UEs 115 device may be configured to select at least one S-SSB candidate from a plurality of configured candidates for communicating at least one S-SSB. In some aspects, the SL synchronization communication resources include at least one slot comprising 14 symbols. Some aspects, the at least one slot may include a plurality of symbols allocated for a physical broadcast channel (PBCH) signal, two or more symbols allocated for a primary synchronization signal (PSS), and two or more symbols allocated for a secondary synchronization signal (SSS). The final symbol may be a gap symbol. In this regard, the SL synchronization resources may be similar or identical to the resources illustrated in FIG. 11A.

In another aspect, the S-SSB resources may include at least one slot including a first S-SSB candidate and a second S-SSB candidate. In some aspects, each of the S-SSB candidates include four contiguous symbols. In some aspects, a first symbol of each candidate is allocated for a sidelink primary synchronization signal (S-PSS), the second and fourth symbols are allocated for a physical sidelink broadcast channel (PSBCH) signal, and the third symbol is allocated for a combination of a sidelink secondary synchronization signal (S-SSS) and the PSBCH signal. In this regard, the SL synchronization communication resources may be similar or identical to the resources illustrated in FIG. 11B.

In another aspect, receiving the S-SSB configuration may include receiving a SL-SyncConfig IE indicating the timing parameters associated with the communication of S-SSBs.

In some aspects, the S-SSB resources may occupy a first portion of the shared frequency band. For example, the S-SSB resources may occupy 11 resource blocks (RBs) of the shared frequency band. In some aspects, the shared frequency band is approximately 20 MHz. However, other bandwidths for the shared frequency band are also contemplated by the present disclosure, including 10 MHz, 15 MHz, 25 MHz, 30 MHz, and/or any other suitable value, greater or smaller. In another aspect, the S-SSB resources may occupy 11 RBs for the S-PSS, and 20 RBs for the S-SSS and PSBCH. In another aspect, the S-SSB resources may include a subset of resources from an SL resource pool.

In some aspects, the first portion of the shared frequency band allocated for the S-SSB may be below network specifications or requirements. For example, in some instances, the frequency resources allocated for the S-SSB may be below 2 MHz. In some aspects, the bandwidth occupied by the S-SSB may be based on the subcarrier spacing (SCS) used for the communication. The SCS may also be referred to as the numerology, in some aspects. For example, if the S-SSB resources include 11 RBs and the UE 115-D is configured to communicate using a 15 kHz SCS, the bandwidth of the S-SSB using the 15 kHz SCS may be below the 2 MHz threshold. In other aspects, the S-SSB resources may exceed 2 MHz for a given SCS, but may fall below a 80% occupied channel bandwidth (OCB) threshold.

At 915, the UE 115-*d* may perform a channel access procedure to gain access to a bandwidth part in a shared spectrum for sidelink communications with a UE 115-*e*. For example, the UE 115-*d* may perform an LBT procedure. In some cases, the UE 115-*d* may perform the channel access procedure and establish one or more communication links with the UE 115-*e* based on performing the channel access procedure. For example, the UE 115-*d* may reserve a channel for communicating with the UE 115-*e*. In some cases, the UE 115-*e* may perform a channel access procedure to gain access to the bandwidth part in the shared spectrum for sidelink communications with the UE 115-*d*.

At 920, the UE 115-*d* may transmit, via a PSCCH, an SCI message indicating which of one or more sub-bands include one or more S-SSBs. In some cases, the SCI message includes a bitmap indicating which of the one or more sub-bands include the one or more S-SSB. In some cases, the SCI message includes a sub-band index field indicating which of the one or more sub-bands include the one or more S-SSBs. The SCI message may be transmitted within a sub-band of the one or more sub-bands. The SCI message may include a bit indicating that the one or more S-SSBs are transmitted in the sub-band. In some cases, the one or more S-SSBs may be transmitted in at least two sub-bands of the one or more sub-bands. In some cases, the SCI message may fill a resource gap between resources for a PSCCH and the one or more S-SSBs based on the UE 115-*d* performing one or more rate matching operations associated with the SCI message.

At 925, the UE 115-D may rate match one or more S-SSBs for transmission to the UE 115-E. The S-SSB may be rate matched to occupy a second portion of the shared frequency band. In some aspects, the second portion of the shared frequency band is larger than the first portion of the shared frequency band, and includes the first portion of the shared frequency band. In some aspects, rate matching the S-SSB includes or results in frequency-padding the S-SSB such that additional RBs and/or REs in the frequency domain are occupied by the S-SSB.

In another aspect, the S-SSB resources comprise a slot and a first quantity of RBs, such as 11 RBs and/or 20 RBs as explained above. In another aspect, the first quantity of RBs may be allocated for a PBCH signal, a PSS signal, and a SSS signal. In some aspects, rate matching the S-SSB may include rate matching the SL synchronization to occupy a second quantity of RBs larger than the first quantity of RBs. For example, the UE 115-D may rate match at least the PBCH to occupy 20 RBs, or more than 20 RBs. In some aspects, the second quantity of RBs may satisfy one or more channel occupancy thresholds and/or requirements.

At 930, the UE 115-D may determine or select an S-SSB candidate from a plurality of S-SSB candidates. For example, the S-SSB resources may include one or more S-SSB candidates each having a plurality of contiguous symbols in the time domain. In one example, each S-SSB slot may comprise a first S-SSB candidate and a second S-SSB candidate, as shown in the resource configuration 1200*a* of FIG. 12A. In another aspect, each slot may include three or more SL synchronization candidate locations, as shown in FIG. 12B. In another aspect, the SL synchronization communication resources may include a plurality of slots, including a first slot contiguous with a second slot. At least one of the SL synchronization candidate locations may include a portion (e.g., one or more symbols) in the first slot, and a portion (e.g., one or more other symbols) in the second slot. In other words, the SL synchronization communication resources may include one or more SL synchronization candidate locations located across slots, as shown in FIG. 12C. In another aspect, the SL resource pool may include one or more S-SSB candidate location allocations, as described with respect to FIGS. 7 and 8, for example. By including additional S-SSB candidate locations in the S-SSB resources, the overhead may be reduced. The UE 115-D may select one or more of the candidate locations to transmitting the one or more S-SSBs.

Figure 10:
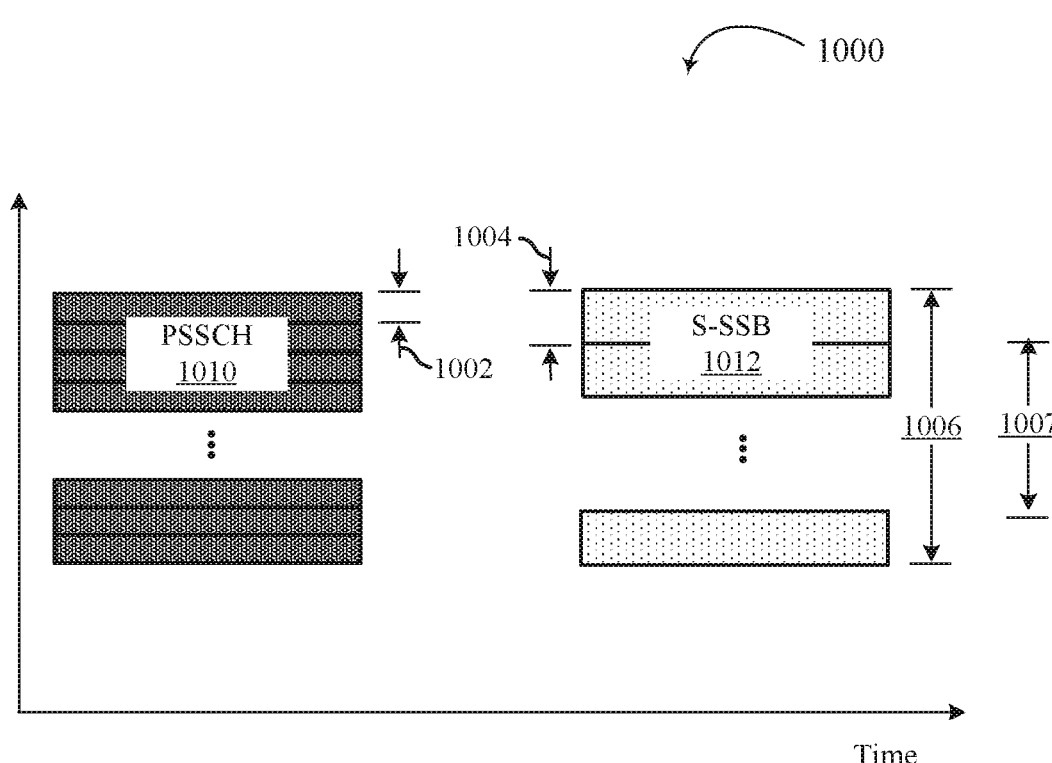
FIG. 10 is a diagram of a S-SSB resource configuration for communication in a shared frequency band in accordance with one or more aspects of the present disclosure.
Figures 11A, 11B:
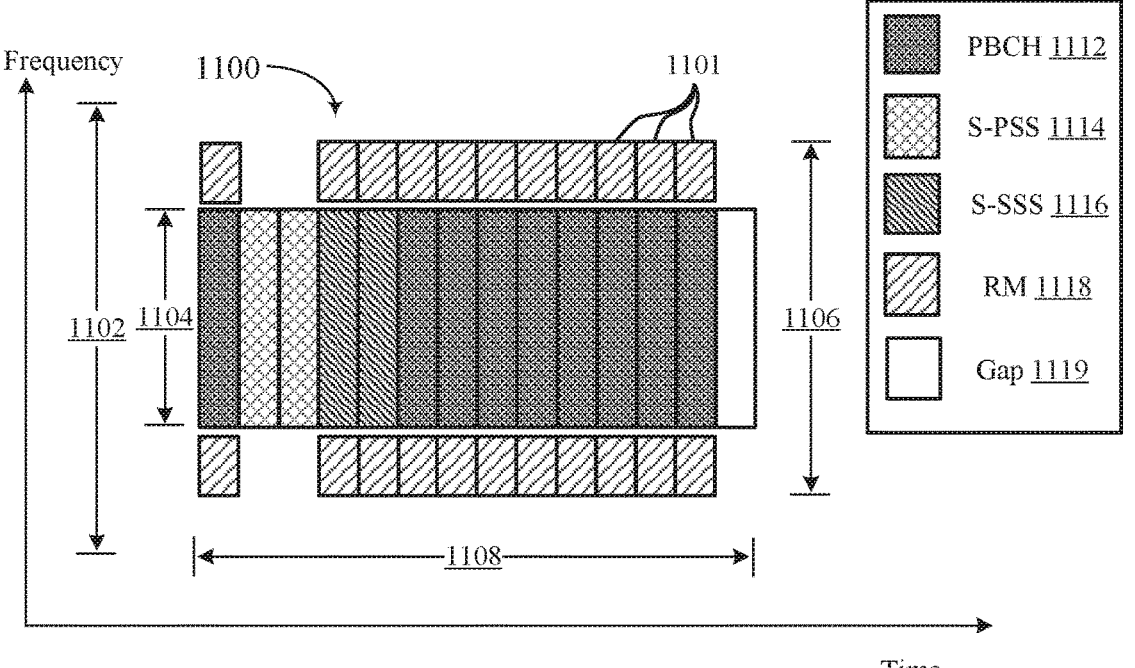
FIG. 11A is a diagram of a S-SSB resource configuration for communication in a shared frequency band in accordance with one or more aspects of the present disclosure.
FIG. 11B is a diagram of a S-SSB resource configuration for communication in a shared frequency band in accordance with one or more aspects of the present disclosure.

At 935, the UE 115-D transmits, and the UE 115-E receives, the one or more S-SSBs. In some aspects, action 935 includes transmitting the one or more S-SSBs based on the rate matching of action 925 such that the one or more S-SSBs occupy a larger second portion of the shared frequency band, as illustrated in FIGS. 11A and 11B, for example. In other aspects, the UE 115-D may transmit the S-SSB based on a second SCS larger than the first SCS associated with the SL resource pool, as illustrated in FIG. 10, for example. In one example, the SL resource pool may be associated with a SCS of 15 kHz, and the transmitting the one or more S-SSBs may be based on a SCS of 30 kHz, 60 kHz, 120 kHz, and/or any other suitable numerology. Accordingly, the bandwidth of SL communications communicated in the SL resource pool may be based on the 15 kHz numerology, and the bandwidth of the S-SSBs may be based on a 30 kHz SCS, a 60 kHz SCS, a 120 kHz SCS and/or any other suitable SCS that is larger than the first SCS. In another example, the SL resource pool may be associated with a 30 kHz SCS, and the one or more S-SSBs may be transmitted using a 60 kHz SCS, a 120 kHz SCS and/or any other suitable SCS.

In other aspects, the second SCS may be the same as the first SCS used to communicate SL data in the SL resource pool. For example, the UE 115-D may be configured with a fixed SCS or numerology for the one or more S-SSBs. In some aspects, the UE 115-D may be configured with a fixed minimum SCS or numerology for the one or more S-SSBs, such that the SCS for the S-SSBs may vary with the configured SL resource pool, but is not allowed to fall below the minimum fixed SCS. In some aspects, the fixed SCS, or the minimum fixed SCS, may be 30 kHz, 60 kHz, 120 kHz, or any other suitable SCS. In one example, the UE 115-D may be configured to use a 30 kHz SCS if the SL resource pool is configured with a SCS of 15 kHz or an SCS of 30 kHz. If the SL resource pool is configured with a SCS of 60 kHz, the second SCS may be increased with the SL resource pool to 60 kHz. Other examples are also contemplated by the present disclosure.

In some aspects, the transmitting the S-SSB may include transmitting, in one of the first S-SSB candidate or the second S-SSB candidate: a PSS occupying the second quantity of RBs, and the PBCH signal rate matched to occupy a third quantity of RBs greater than the first quantity RBs. In some aspects, the third quantity of RBs may satisfy one or more channel occupancy thresholds and/or requirements. For example, in some aspects, the first quantity of RBs may occupy less than 2 MHz. The rate matched SL synchronization having the third quantity of RBs may occupy more than 2 MHz, in some aspects. In another example, the first quantity of RBs may not satisfy, for at least one SCS, a 80% OCB threshold. The second quantity of RBs may be at, near, or exceeding the 80% OCB threshold.

At 940, the UE 115-E may decode the one or more S-SSBs based on receiving the signal. In some cases, the UE 115-E may receive an SCI message from the UE 115-D. The SCI message may include a bitmap indicating which of the one or more sub-bands include the one or more S-SSBs. The SCI message may include a sub-band index field indicating which of the one or more sub-bands include the one or more S-SSBs. In some cases, the UE 115-E may perform one or more operations to decode the one or more S-SSBs.

As mentioned above, the S-SSB resources indicated in the first configuration may include one or more slots allocated for one or more S-SSBs. In another aspect, the S-SSB resources may include resources in the SL resource pool, such that the SL resource pool includes SL data resources and S-SSB resources. In some aspects, the S-SSB resources include a combination of S-SSB slots and S-SSB resources in the SL resource pool. In some aspects, the process flow 900 may further include the UE 115-D receiving a signal activating: the one the one or more slots allocated for the one or more S-SSBs; the further S-SSB resources and the SL data resources; or a combination thereof. In some aspects, receiving the signal may include receiving the first configuration. For example, the first configuration may include a field, parameter, value, or other indicator indicating a trigger to activate the S-SSB resources described above.

FIG. 10 shows a diagram of a resource configuration 1000 for SL communications in a shared frequency band. As explained above, a UE may be configured with a SL resource pool and/or one or more S-SSB resources. In the configuration 1000, the UE is configured with PSSCH resources 1010, where the PSSCH resources 1010 are associated with a first SCS 1002. The first SCS may be based on the allocated carrier and/or BWP for the PSSCH 1010. For example, the first SCS may be 15 kHz, 30 kHz, 60 kHz, 120 kHz, and/or any other suitable numerology. The bandwidth occupied by the PSSCH resources 1010 may be based on the first SCS 1002. For example, the PSSCH resources 1010 may include a plurality of RBs, where each RB includes a plurality of subcarriers. Because the size of the subcarriers in the frequency domain is based on the first SCS 1002, the bandwidth of the RBs of the PSSCH resources 1010 may also be based on the first SCS 1002.

In some aspects, a UE may be configured to communicate S-SSBs using the same SCS configured for the PSSCH resources 1010. According to aspects of the present disclosure, the UE may be configured with a fixed and/or minimum fixed SCS for communicating S-SSBs in shared frequency band. In this regard, according to the resource configuration 1000, the UE may be configured with a fixed and/or minimum fixed SCS 1004 larger than the first SCS 1002. For example, the SCS 1002 may be 15 kHz, and the fixed SCS 1004 may be 30 kHz, 60 kHz, 120 kHz, and/or any other suitable numerology. The larger fixed SCS 1004 may cause the S-SSB 1012 to occupy a greater amount of the shared frequency band. In this regard, the S-SSB 1012 may occupy a first portion 1006 of the shared frequency band using the fixed SCS 1004, where the S-SSB 1012 would have occupied a smaller, second portion 1007 of the shared frequency band if the S-SSB 1012 were based on the first SCS 1002. Accordingly, the UE may increase the occupied channel bandwidth (OCB) of the S-SSB 1012 in the shared frequency band by increasing the SCS used for the S-SSB. In some aspects, the SCS for the S-SSB may be a fixed value for all frequency bands, such that the SCS of the S-SSB 1012 may not depend on the SCS 1002 of the SL data resources (e.g., PSSCH, PSCCH, PSFCH). In other aspects, the SCS 1004 used for the S-SSB may be a minimum SCS value, such that the SCS 1004 used for the S-SSB may increase if the SCS 1002 used for the SL resource pool increases above the minimum SCS value.

FIGS. 11A and 11B are diagrams illustrating S-SSB resource configurations 1100, 1120, according to aspects of the present disclosure. In particular, FIGS. 11A and 11B illustrate S-SSB resource configurations that include or involve rate matching one or more portions of the S-SSB to occupy a greater portion of the allocated bandwidth. FIG. 11A illustrates a first S-SSB resource allocation configuration 1100 in which the S-SSB occupies a S-SSB slot. The S-SSB slot 1108 includes a plurality of symbols 1101. Further, the resource allocation configuration 1100 includes a bandwidth 1104, which is a portion of the allocated frequency band 1102 associated with the SL resource pool. The symbols 1101 of the slot 1108 may be allocated for portions of the S-SSB. For example, the symbols indexed 0 and 5-12 may be allocated for a PBCH 1112. In some aspects, the PBCH may be referred to as a PSBCH. The symbols indexed 1-2 may be allocated for a S-PSS 1114. The symbols indexed 3-4 may be allocated for a S-SSS 1116. The final symbol indexed 13 may be a gap symbol 1119, or a guard symbol. The configuration 1100 may allocate 11 RBs for the PBCH 1112, the S-PSS 1114, and the S-SSS 1116. According to the resource allocation configuration 1100 of FIG. 11A, the UE may rate match at least a portion of the S-SSB to occupy a portion 1106 of the total bandwidth 1102, which may be greater than the portion 1104 allocated for the S-SSB. In some aspects, the UE may rate match the PBCH 1112 and the S-SSS 1116 to include rate matched (RM) portions 1118, as shown in FIG. 11A. In other aspects, the UE may rate match only the PBCH 1112. In another aspect, the UE may rate match the PBCH 1112, the S-PSS 1114, and the S-SSS 1116. In some aspects, rate matching the S-SSB according to the configuration 1100 may allow the S-SSB to satisfy one or more channel occupancy requirements and/or thresholds.

Referring to FIG. 11B, a second resource allocation configuration 1120 is provided. In the second resource allocation configuration 1120, the UE may be configured with a plurality of S-SSB candidates, where each S-SSB candidate includes a time domain allocation 1109 of four contiguous symbols. Similar to the configuration 1100, the configuration 1120 may include allocations for a PBCH 1112, S-PSS 1114, and S-SSS 1116. In some aspects, the configuration 1120 may include 11 RBs for the S-PSS 1114, and 20 RBs 1105 for the PBCH 1112 and the S-SSS 1116. According to the configuration 1120, the UE may rate match the PBCH 1112 and the S-SSS 1116 to include a RM portion 1118. The RM portion 1118 may cause the S-SSB to occupy a greater portion 1106 of the total bandwidth.

Figure 12A:
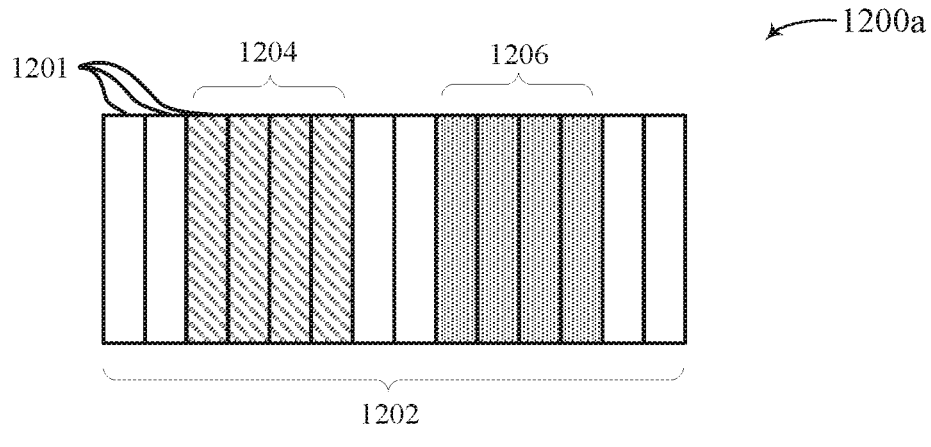
FIG. 12A is a diagram of a S-SSB resource configuration for communication in a shared frequency band in accordance with one or more aspects of the present disclosure.
Figure 12B:
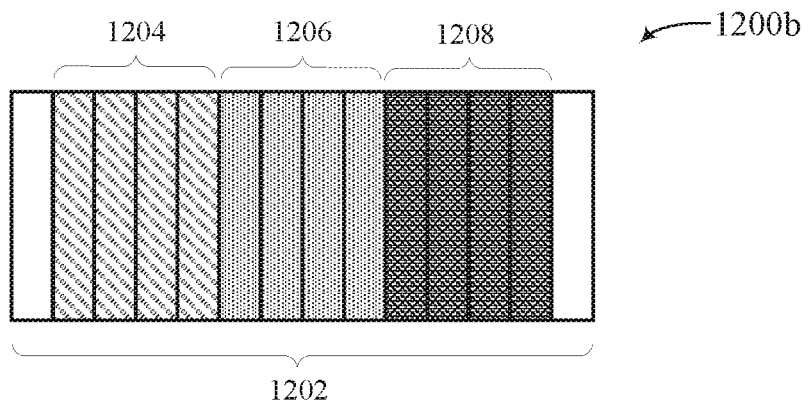
FIG. 12B is a diagram of a S-SSB resource configuration for communication in a shared frequency band in accordance with one or more aspects of the present disclosure.
Figure 12C:
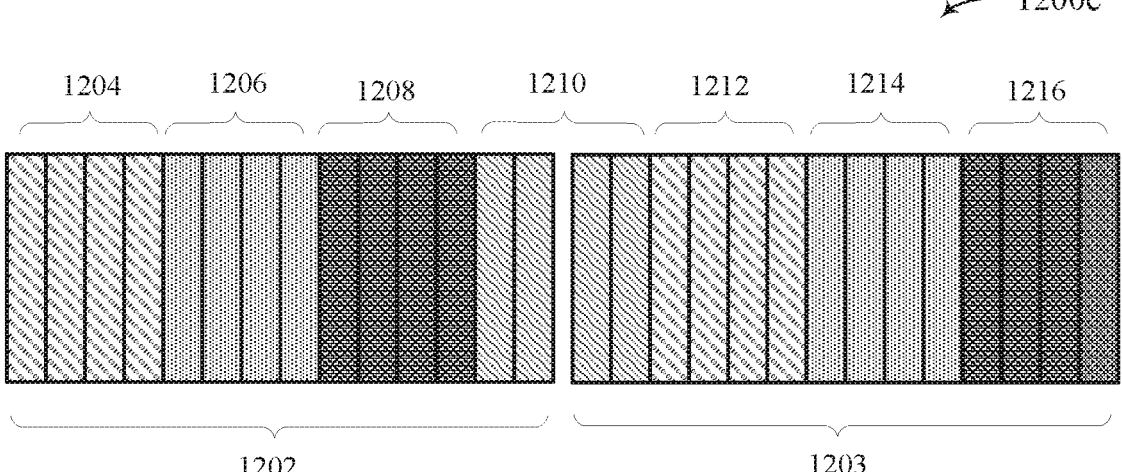
FIG. 12C is a diagram of a S-SSB resource configuration for communication in a shared frequency band in accordance with one or more aspects of the present disclosure.

FIGS. 12A-12C are diagrams illustrating S-SSB candidate configurations 1200, according to aspects of the present disclosure. Aspects of the configurations 1200 may be used in conjunction with the process flow 900. In some aspects, the configurations 1200 may provide multiple S-SSB candidate locations to reduce overhead and reduce the number of S-SSB slots that are allocated to SL UEs. Referring to FIG. 12A, the S-SSB candidate configuration 1200a includes a first S-SSB candidate 1204 and a second S-SSB candidate 1206 in a slot 1202. In some aspects, a UE may receive a S-SSB configuration indicating the starting symbols and/or symbol lengths of the S-SSB candidates 1204, 1206. The slot 1202 includes a plurality of symbols 1201, and each candidate occupies four symbols. In some aspects, each candidate 1204, 1206, may have a resource configuration similar or identical to that shown in FIG. 1/B. For example, each candidate 1204, 1206 may include 11 RBs allocated for a S-PSS, and 20 RBs allocated for a PBCH and a S-SSS. However, other frequency allocations and symbol allocations are also contemplated by the present disclosure. Referring to FIG. 12B, a second S-SSB candidate configuration 1200b is shown in which the S-SSB slot 1202 includes three S-SSB candidates 1204, 1206, and 1208. In the illustrated example, the S-SSB candidates are contiguous. However, it will be understood that, in other aspects, one or more of the S-SSB candidates may be non-contiguous with at least one other S-SSB candidate in the slot 1202.

Referring to FIG. 12C, a third S-SSB candidate configuration 1200c is shown in which a plurality of S-SSB candidates 1204, 1206, 1208, 1210, 1212, 1214, 1216 are distributed across a first S-SSB slot 1202 and a second S-SSB slot 1203. As above, each candidate may include four symbols in the time domain. In the configuration 1200c, a fourth S-SSB candidate 1210 includes a first portion of two symbols in the first slot 1202, and a second portion of two symbols in the second slot 1203. Accordingly, in some aspects, a UE may be provided with a S-SSB configuration in which a plurality of S-SSB candidate locations are provided over a plurality of slots. Further, at least one S-SSB candidate may spread across two slots. In some aspects, the at least one S-SSB candidate may be divided evenly between the two slots. In other aspects, the at least one S-SSB candidate may be unevenly divided between the two slots.

Figure 13:
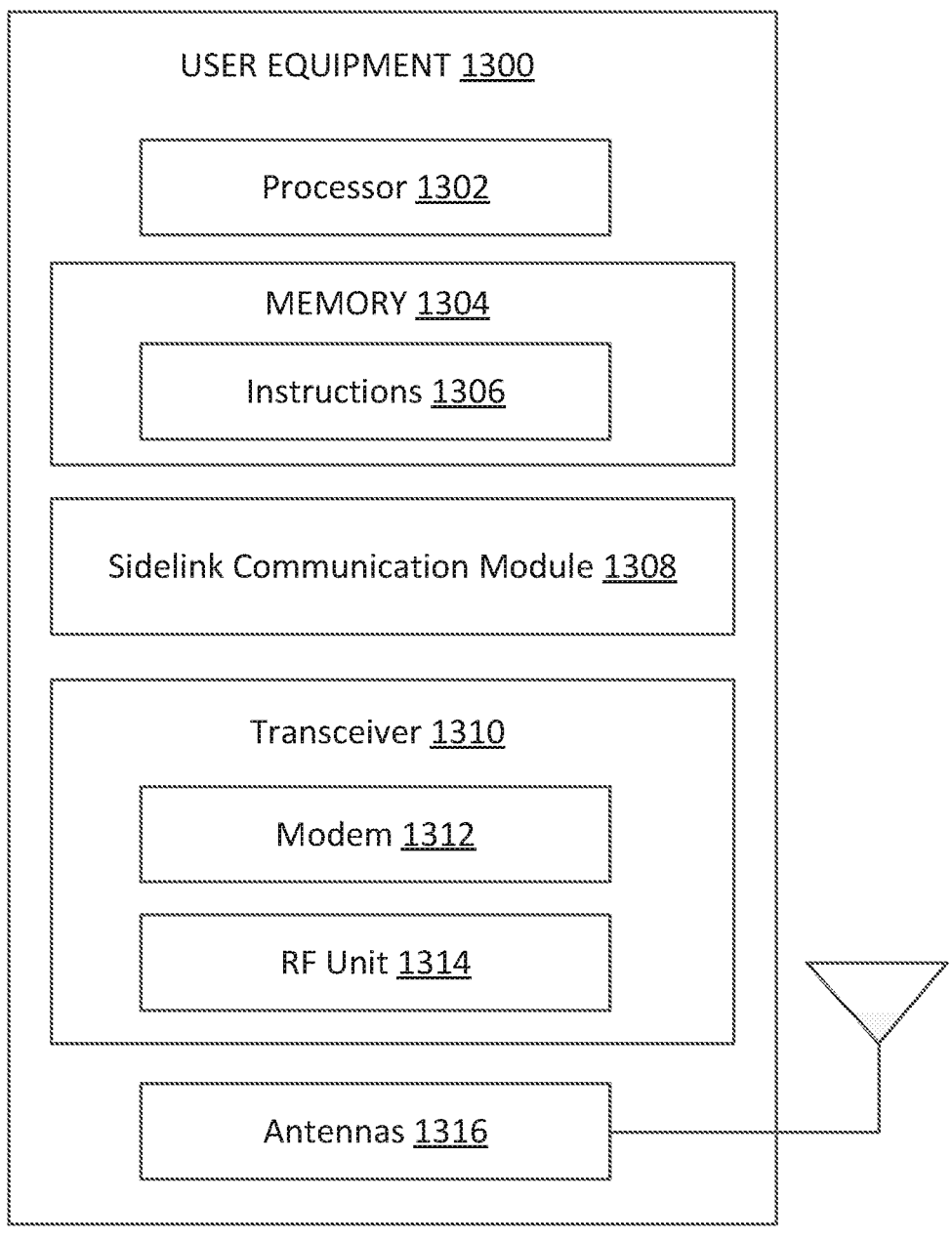
FIG. 13 is a block diagram of an exemplary user equipment (UE) in accordance with some aspects of the present disclosure.

FIG. 13 is a block diagram of an exemplary UE 1300 according to some aspects of the present disclosure. The UE 1300 may be a UE 115 discussed above in FIG. 1. As shown, the UE 1300 may include a processor 1302, a memory 1304, an sidelink communication module 1308, a transceiver 1310 including a modem subsystem 1312 and a radio frequency (RF) unit 1314, and one or more antennas 1316. These elements may be in direct or indirect communication with each other, for example via one or more buses.

The processor 1302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1302 may also be implemented as a combination of computing devices, e.g., a combination of a DSP and a microprocessor, a plurality of microprocessors, one or more microprocessors in conjunction with a DSP core, or any other such configuration.

The memory 1304 may include a cache memory (e.g., a cache memory of the processor 1302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1304 includes a non-transitory computer-readable medium. The memory 1304 may store, or have recorded thereon, instructions 1306. The instructions 1306 may include instructions that, when executed by the processor 1302, cause the processor 1302 to perform the operations described herein with reference to the UEs 115 in connection with aspects of the present disclosure, for example, aspects of FIGS. 1-12C. Instructions 1306 may also be referred to as program code. The program code may be for causing a wireless communication device to perform these operations, for example by causing one or more processors (such as processor 1302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The sidelink communication module 1308 may be implemented via hardware, software, or combinations thereof. For example, the sidelink communication module 1308 may be implemented as a processor, circuit, and/or instructions 1306 stored in the memory 1304 and executed by the processor 1302. In some instances, the sidelink communication module 1308 can be integrated within the modem subsystem 1312. For example, the sidelink communication module 1308 can be implemented by a combination of software components (e.g., executed by a DSP or a general processor) and hardware components (e.g., logic gates and circuitry) within the modem subsystem 1312.

The sidelink communication module 1308 may be used for various aspects of the present disclosure, for example, aspects of FIGS. 1-12C. The sidelink communication module 1308 may be configured to receive a first configuration indicating SL synchronization communication resources, and receive a second configuration indicating a SL resource pool. In some aspects, the SL resource pool may be associated with a first SCS. In some aspects, receiving the first configuration may include receiving one or more radio resource control (RRC) messages or information elements indicating one or more parameters for the SL synchronization communication resources. In some aspects, the SL synchronization communication resources may include time-frequency resources for communicating SL synchronization signal blocks (S-SSBs). In some aspects, the SL synchronization communication resources may include one or more slots and/or one or more symbols in the time domain. In some aspects, the SL synchronization communication resources may include one or more SL synchronization communication candidates or instances. For example, the sidelink communication module 1308 may be configured to may be configured to select at least one S-SSB candidate from a plurality of configured candidates for communicating at least one S-SSB. In some aspects, the SL synchronization communication resources include at least one slot comprising 14 symbols. Some aspects, the at least one slot may include a plurality of symbols allocated for a physical broadcast channel (PBCH) signal, two or more symbols allocated for a primary synchronization signal (PSS), and two or more symbols allocated for a secondary synchronization signal (SSS). The final symbol may be a gap symbol. In this regard, the SL synchronization resources may be similar or identical to the resources illustrated in FIG. 11A.

In another aspect, the SL synchronization communication resources may include at least one slot including a first SSB candidate and a second SSB candidate. In some aspects, each of the SSB candidates include four contiguous symbols. In some aspects, a first symbol of each candidate is allocated for a PSS, the second and fourth symbols are allocated for a PBCH signal, and the third symbol is allocated for a combination of a SSS and the PBCH signal. In this regard, the SL synchronization communication resources may be similar or identical to the resources illustrated in FIG. 11B.

In some aspects, sidelink communication module 1308 may be configured to receive a SL resource allocation configuration from a network entity. The network entity may include a BS, such as one of the BSs 140 and/or the network entity 1400. The SL resource allocation may be indicated in a SL BWP configuration provided by an RRC IE. For example, the SL synchronization communication configuration may be indicated in a SL-ResourcePool IE. In another aspect, receiving the SL synchronization communication may include receiving a SL-SyncConfig IE indicating the timing parameters associated with the communication of S-SSBs.

In some aspects, the sidelink communication module 1308 may be configured to receive the second configuration indicating a SL resource pool. For example, the SL resource pool may include time and frequency resources for SL data, SL control information, SL feedback information, and/or SL reference signals. In some aspects, the SL resource pool may include physical sidelink control channel (PSCCH) resources, physical sidelink shared channel (PSSCH) resources, physical sidelink feedback channel (PSFCH) resources, and/or any other suitable resources. The SL resource pool may include a subset of resources allocated for at least one S-SSB candidate, as shown in FIGS. 7 and 8, for example. In some aspects, the resources allocated for SL synchronization communications may include a combination of S-SSB slots and SL resource pool resources.

In some aspects, the sidelink communication module 1308 may be configured to transmit a SL synchronization communication based on a second SCS larger than the first SCS. For example, the sidelink communication module 1308 may be configured to apply a fixed SCS and/or a fixed minimum SCS to the SL synchronization communication such that the SL synchronization communication occupies a larger portion of the SL bandwidth than would be occupied using the first SCS. In some aspects, the sidelink communication module 1308 is further configured to transmit a SL communication based on the first SCS.

According to another aspect of the present disclosure, the sidelink communication module 1308 may be configured to receive a first configuration indicating sidelink (SL) synchronization communication resources. In some aspects, the SL synchronization communication resources comprise a first portion of a shared frequency band. The first portion of the shared frequency band may include a plurality of RBs. In another aspect, the sidelink communication module 1308 may be configured to transmit, based on the first configuration, a SL synchronization communication rate matched to occupy a second portion of the shared frequency band. In some aspects, the second portion of the shared frequency band is larger than the first portion of the shared frequency band, and includes the first portion of the shared frequency band. In some aspects, rate matching the SL synchronization communication includes or results in frequency-padding the SL synchronization communication such that additional RBs and/or REs in the frequency domain are occupied by the SL synchronization communication.

As shown, the transceiver 1310 may include the modem subsystem 1312 and the RF unit 1314. The transceiver 1310 can be configured to communicate bi-directionally with other devices, such as the BSs 105. The modem subsystem 1312 may be configured to modulate and/or encode the data from the memory 1304 and/or the sidelink communication module 1308 according to a modulation and coding scheme (MCS), e.g., a low-density parity check (LDPC) coding scheme, a turbo coding scheme, a convolutional coding scheme, a digital beamforming scheme, etc. The RF unit 1314 may be configured to process (e.g., perform analog to digital conversion or digital to analog conversion, etc.) modulated/encoded data (e.g., PSSCH data, PSCCH control information, and/or PSFCH data) from the modem subsystem 1312 (on outbound transmissions) or of transmissions originating from another source such as a UE 115 or a network entity 105. The RF unit 1314 may be further configured to perform analog beamforming in conjunction with the digital beamforming. Although shown as integrated together in transceiver 1310, the modem subsystem 1312 and the RF unit 1314 may be separate devices that are coupled together at the UE 115 to enable the UE 115 to communicate with other devices.

The RF unit 1314 may provide the modulated and/or processed data, e.g. data packets (or, more generally, data messages that may contain one or more data packets and other information), to the antennas 1316 for transmission to one or more other devices. The antennas 1316 may further receive data messages transmitted from other devices. The antennas 1316 may provide the received data messages for processing and/or demodulation at the transceiver 1310. The transceiver 1310 may provide the demodulated and decoded data (e.g., the frequency interlace configuration, PSSCH data, PSCCH control information, and/or PSFCH information) to the sidelink communication module 1308 for processing. The antennas 1316 may include multiple antennas of similar or different designs in order to sustain multiple transmission links. The RF unit 1314 may configure the antennas 1316.

In an example, the transceiver 1310 is configured to receive SL resource allocations and/or configurations from a BS (e.g., the BSs 140) indicating SL resource pools and/or SL synchronization communication resources. The transceiver 1310 may be further configured to transmit SL communications (e.g., PSSCH data, SCI) and SL synchronization communications based on the configurations and by coordinating with the sidelink communication module 1308.

In an aspect, the UE 1300 can include multiple transceivers 1310 implementing different RATs (e.g., NR and LTE). In an aspect, the UE 1300 can include a single transceiver 1310 implementing multiple RATs (e.g., NR and LTE). In an aspect, the transceiver 1310 can include various components, where different combinations of components can implement different RATs.

Figure 14:
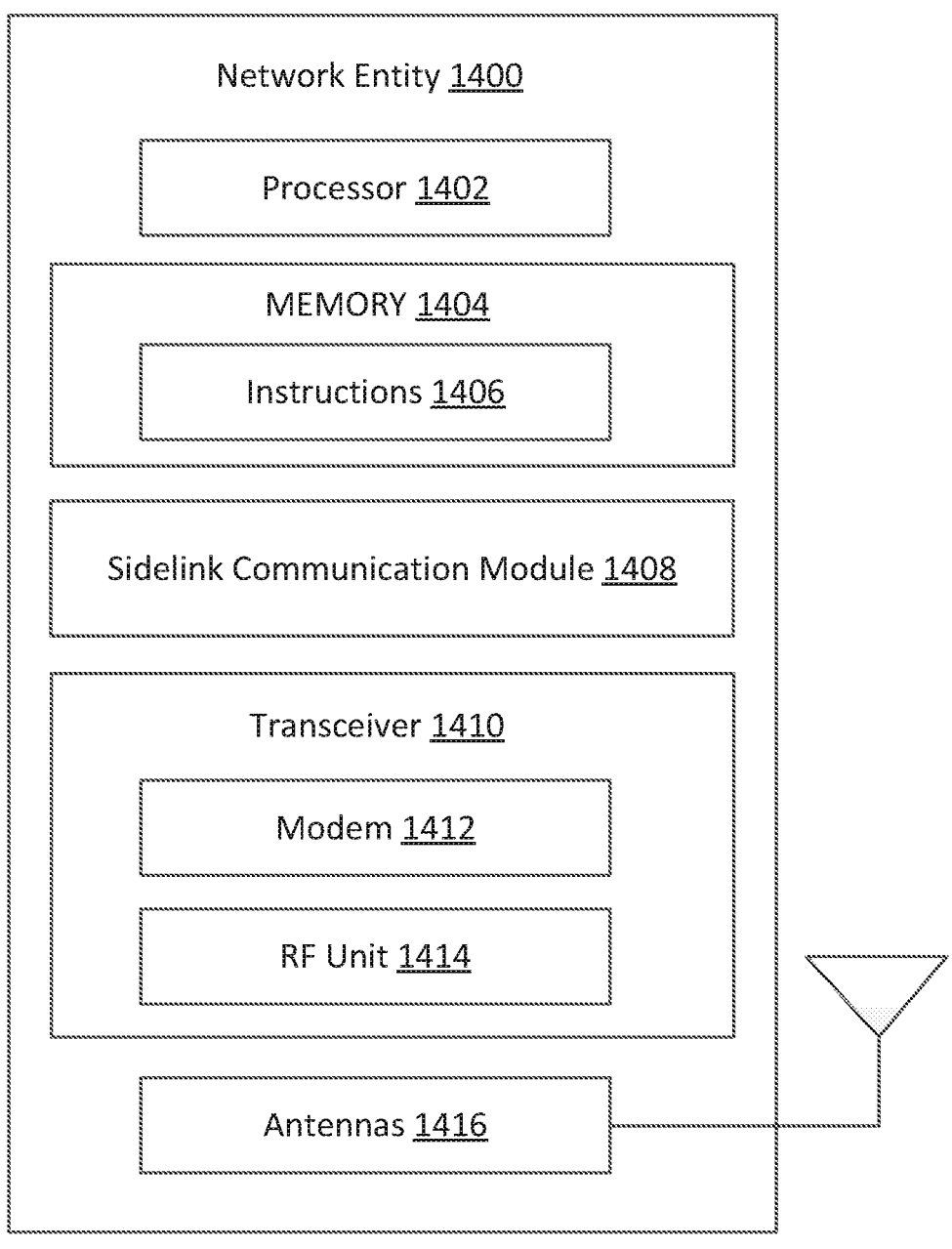
FIG. 14 is a block diagram of an exemplary network entity in accordance with some aspects of the present disclosure.

FIG. 14 is a block diagram of an exemplary network entity 1400 according to some aspects of the present disclosure. The network entity 1400 may be a BS in the wireless communications system 100 as discussed above in FIG. 1. The network entity 1400 may include an aggregated BS and/or a disaggregated BS, in some aspects. As shown, the network entity 1400 may include a processor 1402, a memory 1404, an sidelink communication module 1408, a transceiver 1410 including a modem subsystem 1412 and a RF unit 1414, and one or more antennas 1416. These elements may be in direct or indirect communication with each other, for example via one or more buses.

The processor 1402 may have various features as a specific-type processor. For example, these may include a CPU, a DSP, an ASIC, a controller, a FPGA device, another hardware device, a firmware device, or any combination thereof configured to perform the operations described herein. The processor 1402 may also be implemented as a combination of computing devices, e.g., a combination of a DSP and a microprocessor, a plurality of microprocessors, one or more microprocessors in conjunction with a DSP core, or any other such configuration.

The memory 1404 may include a cache memory (e.g., a cache memory of the processor 1402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1404 may include a non-transitory computer-readable medium. The memory 1404 may store instructions 1406. The instructions 1406 may include instructions that, when executed by the processor 1402, cause the processor 1402 to perform operations described herein, for example, aspects of FIGS. 1-12C. Instructions 1406 may also be referred to as code, which may be interpreted broadly to include any type of computer-readable statement(s) as discussed above with respect to FIG. 13.

The sidelink communication module 1408 may be implemented via hardware, software, or combinations thereof. For example, the sidelink communication module 1408 may be implemented as a processor, circuit, and/or instructions 1406 stored in the memory 1404 and executed by the processor 1402. In some instances, the sidelink communication module 1408 can be integrated within the modem subsystem 1412. For example, the sidelink communication module 1408 can be implemented by a combination of software components (e.g., executed by a DSP or a general processor) and hardware components (e.g., logic gates and circuitry) within the modem subsystem 1412.

The sidelink communication module 1408 may be used for various aspects of the present disclosure, for example, aspects of FIGS. 1-12C. The sidelink communication module 1408 may be configured to transmit one or more SL resource configurations to one or more UEs configured to communicate using an SL protocol. For example, the sidelink communication module 1408 may be configured to transmit a SL resource pool configuration and/or a SL synchronization communication, as further described below.

As shown, the transceiver 1410 may include the modem subsystem 1412 and the RF unit 1414. The transceiver 1410 can be configured to communicate bi-directionally with other devices, such as the UEs 115 and/or 1300 and/or another core network element. The modem subsystem 1412 may be configured to modulate and/or encode data according to a MCS, e.g., a LDPC coding scheme, a turbo coding scheme, a convolutional coding scheme, a digital beamforming scheme, etc. The RF unit 1414 may be configured to process (e.g., perform analog to digital conversion or digital to analog conversion, etc.) modulated/encoded data (e.g., grants, resource allocations) from the modem subsystem 1412 (on outbound transmissions) or of transmissions originating from another source such as a UE 115 and/or UE 1300. The RF unit 1414 may be further configured to perform analog beamforming in conjunction with the digital beamforming. Although shown as integrated together in transceiver 1410, the modem subsystem 1412 and/or the RF unit 1414 may be separate devices that are coupled together to communicate with other devices.

The RF unit 1414 may provide the modulated and/or processed data, e.g. data packets (or, more generally, data messages that may contain one or more data packets and other information), to the antennas 1416 for transmission to one or more other devices. This may include, for example, transmission of information to complete attachment to a network and communication with a camped UE 115 or 1300 according to some aspects of the present disclosure. The antennas 1416 may further receive data messages transmitted from other devices and provide the received data messages for processing and/or demodulation at the transceiver 1410. The transceiver 1410 may provide the demodulated and decoded data (e.g., S-SSB, SL data, SCI) to the sidelink communication module 1408 for processing. The antennas 1416 may include multiple antennas of similar or different designs in order to sustain multiple transmission links.

In an aspect, the network entity 1400 can include multiple transceivers 1410 implementing different RATs (e.g., NR and LTE). In an aspect, the network entity 1400 can include a single transceiver 1410 implementing multiple RATs (e.g., NR and LTE). In an aspect, the transceiver 1410 can include various components, where different combinations of components can implement different RATs.

FIG. 15 shows a flowchart illustrating a method 1500 that supports S-SSB designs for shared spectrum in accordance with one or more aspects of the present disclosure. The operations of the method 1500 may be implemented by a UE or its components as described herein. For example, the operations of the method 1500 may be performed by a UE 115 as described with reference to FIGS. 1 through 12C. In some examples, a UE may execute a set of instructions to control the functional elements of the UE to perform the described functions. Additionally, or alternatively, the UE may perform aspects of the described functions using special-purpose hardware.

At 1505, the method may include the wireless communication device receiving a first configuration indicating sidelink (SL) synchronization communication resources. In some aspects, the wireless communication device includes a user equipment (UE) configured for SL communication in a shared frequency band. For example, the UE may be configured for SL-unlicensed (SL-U) communications with one or more other UEs in the shared frequency band. In some aspects, receiving the first configuration may include receiving one or more radio resource control (RRC) messages or information elements indicating one or more parameters for the SL synchronization communication resources. In some aspects, the SL synchronization communication resources may include time-frequency resources for communicating SL synchronization signal blocks (S-SSBs). In some aspects, the SL synchronization communication resources may include one or more slots and/or one or more symbols in the time domain. In some aspects, the SL synchronization communication resources may include one or more SL synchronization communication candidates or instances. For example, the wireless communication device may be configured to select at least one S-SSB candidate from a plurality of configured candidates for communicating at least one S-SSB. In some aspects, the SL synchronization communication resources include at least one slot comprising 14 symbols. Some aspects, the at least one slot may include a plurality of symbols allocated for a physical broadcast channel (PBCH) signal, two or more symbols allocated for a primary synchronization signal (PSS), and two or more symbols allocated for a secondary synchronization signal (SSS). The final symbol may be a gap symbol. In this regard, the SL synchronization resources may be similar or identical to the resources illustrated in FIG. 11A.

In another aspect, the SL synchronization communication resources may include at least one slot including a first SSB candidate and a second SSB candidate. In some aspects, each of the SSB candidates include four contiguous symbols. In some aspects, a first symbol of each candidate is allocated for a PSS, the second and fourth symbols are allocated for a PBCH signal, and the third symbol is allocated for a combination of a SSS and the PBCH signal. In this regard, the SL synchronization communication resources may be similar or identical to the resources illustrated in FIG. 11B.

In some aspects, receiving the SL synchronization communication configuration may include receiving a SL resource allocation configuration from a network entity. The SL resource allocation may be indicated in a SL BWP configuration provided by an RRC IE. For example, the SL synchronization communication configuration may be indicated in a SL-ResourcePool IE. In another aspect, receiving the SL synchronization communication may include receiving a SL-SyncConfig IE indicating the timing parameters associated with the communication of S-SSBs.

In some aspects, the SL synchronization communication resources may occupy a portion of the shared frequency band. For example, the SL synchronization resources may occupy 11 resource blocks (RBs) of the shared frequency band. In some aspects, the shared frequency band is approximately 20 MHz. However, other bandwidths for the shared frequency band are also contemplated by the present disclosure, including 10 MHz, 15 MHz, 25 MHz, 30 MHz, 40 MHz, and/or any other suitable bandwidths. In another aspect, the SL synchronization communication resources may occupy 11 RBs for the PSS, and 20 RBs for the SSS and PBCH. In another aspect, the SL synchronization communication resources may include a subset of resources from an SL resource pool. For example, the SL resource pool may include time and frequency resources for SL data, SL control information, SL feedback information, and/or SL reference signals. In some aspects, the SL resource pool may include physical sidelink control channel (PSCCH) resources, physical sidelink shared channel (PSSCH) resources, physical sidelink feedback channel (PSFCH) resources, and/or any other suitable resources. The SL resource pool may include a subset of resources allocated for at least one S-SSB candidate, as shown in FIGS. 7 and 8, for example. Accordingly, the resources allocated for SL synchronization communications may include a combination of S-SSB slots and SL resource pool resources.

In some aspects, the frequency resources allocated for the SL synchronization communication may be below network specifications or requirements. For example, in some instances, the frequency resources allocated for the SL synchronization communication may be below 2 MHz. In some aspects, the bandwidth occupied by the SL synchronization communication may be based on the subcarrier spacing (SCS) used for the communication. The SCS may also be referred to as the numerology, in some aspects. For example, if the SL synchronization communication resources include 11 RBs and the wireless communication device is configured to communicate using a 15 kHz SCS, the bandwidth of the SL synchronization communication using the 15 kHz SCS may be below the 2 MHz threshold. In other aspects, the SL synchronization communication resources may exceed 2 MHz for a given SCS, but may fall below a 80% occupied channel bandwidth (OCB) threshold. The operations of 1505 may be performed in accordance with examples as disclosed herein. In some examples, aspects of the operations of 1505 may be performed by the sidelink communication module 1308 as described with reference to FIG. 13.

At 1510, the method 1500 may include the wireless communication device receiving a second configuration indicating a SL resource pool. The SL resource pool may be associated with a first SCS. In some aspects, while operating in Mode 1 resource allocation, receiving the second configuration may include receiving a SL-ResourcePool IE. The SL-ResourcePool IE may indicate the SL synchronization resource configuration described above with respect to action 1505. The SL resource pool may include a bandwidth in the shared frequency band. For example, the bandwidth indicated in the SL resource pool may include a plurality of RBs, such as, for example, 11 RBs, 16 RBs, 24 RBs, 25 RBs, 38 RBs, 51 RBs, 52 RBs, 65 RBs, 106 RBs, and/or any other suitable number of RBs. The bandwidth of the SL resources may be 5 MHz, 10 MHz, 15 MHz, 20 MHz, 25 MHz, 30 MHz, 40 MHz, 50 MHz, 60 MHz, 80 MHz, 100 MHz, and/or any other suitable bandwidth. In some aspects, the SCS may be based on the frequency range of the SL resource pool. The operations of 1510 may be performed in accordance with examples as disclosed herein. In some examples, aspects of the operations of 1510 may be performed by the sidelink communication module 1308 as described with reference to FIG. 13.

At 1515, the method 1500 includes the wireless communication device transmitting, based on the first configuration, a SL synchronization communication based on a second SCS larger than the first SCS. In this regard, the shared frequency band may be associated with the first SCS. In some aspects, the first configuration and/or the second configuration may include or indicate the first SCS. The wireless communication device may be configured to transmit the SL synchronization communication using the second SCS, which is larger than the first SCS. In one example, the SL resource pool may be associated with a SCS of 15 kHz, and the transmitting the SL synchronization communication may be based on a SCS of 30 kHz, 60 kHz, 120 kHz, and/or any other suitable numerology. Accordingly, the bandwidth of SL communications communicated in the SL resource pool may be based on the 15 kHz numerology, and the bandwidth of the SL synchronization communication may be based on a 30 kHz SCS, a 60 kHz SCS, a 120 kHz SCS and/or any other suitable SCS that is larger than the first SCS. In another example, the SL resource pool may be associated with a 30 kHz SCS, and the SL synchronization communication may be transmitted using a 60 kHz SCS, a 120 kHz SCS and/or any other suitable SCS.

In other aspects, the second SCS may be the same as the first SCS used to communicate SL data in the SL resource pool. For example, the wireless communication device may be configured with a fixed SCS or numerology for the SL synchronization communications. In some aspects, the wireless communication device may be configured with a fixed minimum SCS or numerology for the SL synchronization communications, such that the SCS for the SL synchronization communications may vary with the configured SL resource pool, but is not allowed to fall below the minimum fixed SCS. In some aspects, the fixed SCS, or the minimum fixed SCS, may be 30 kHz, 60 kHz, 120 kHz, or any other suitable SCS. In one example, the wireless communication device may be configured to use a 30 kHz SCS if the SL resource pool is configured with a SCS of 15 kHz or an SCS of 30 kHz. If the SL resource pool is configured with a SCS of 60 kHz, the second SCS may be increased with the SL resource pool to 60 kHz. Other examples are also contemplated by the present disclosure.

It will be understood that action 1515 may include aspects of the configuration 1000 shown in FIG. 10. In this regard, transmitting the SL synchronization communication using the larger second SCS may include transmitting a S-SSB. Transmitting the S-SSB using the larger second SCS may cause the S-SSB to occupy a larger portion of the shared frequency band that would be occupied if the S-SSB were transmitted using the first SCS. In other words, transmitting the SL synchronization communication may include transmitting the SL synchronization occupying a second portion of the shared frequency band, the second portion of the shared frequency band being larger than the first portion and including the first portion. In some aspects, the second portion may comprise at least 2 MHz. In another aspect, the second portion may comprise at least 80% of the shared frequency band.

In another aspect, action 1515 may include rate matching the SL synchronization communication and transmitting the rate matched SL synchronization communication. The rate matching may include rate matching the SL synchronization to occupy the second portion of the shared frequency band. In other aspects, action 1515 may include transmitting the SL synchronization communication with padding signals extending beyond the frequency resources that would be allocated for the SL synchronization communication if the first SCS were used. In some examples, aspects of the operations of 1515 may be performed by the sidelink communication module 1308 as described with reference to FIG. 13.

At action 1520, the method 1500 includes the wireless communication device transmitting, based on the second configuration, a SL communication based on the first SCS. In some aspects, transmitting the SL communication may include transmitting SCI and/or SL data in a PSCCH and a PSSCH, respectively. The PSCCH and the PSSCH may be included in the SL resource pool indicated in the second configuration. In some aspects, action 1520 may include aspects of the configuration 1000 shown in FIG. 10. Further, in some aspects, the SL resource pool may include one or more SL synchronization communication candidates. Accordingly, in some aspects, transmitting the SL communication in action 1520 may include transmitting a SL synchronization communication based on the first SCS.

In some aspects, the SL synchronization communication resources may include one or more slots. Each slot may include two or more SL synchronization candidate locations. For example, each slot may include two or more four-symbol SL synchronization candidate locations, as explained above with respect to FIG. 1/B and FIG. 12A. In another aspect, each slot may include three or more SL synchronization candidate locations, as shown in FIG. 12B, for example. In another aspect, the SL synchronization communication resources may include a plurality of slots, including a first slot contiguous with a second slot. At least one of the SL synchronization candidate locations may include a portion (e.g., one or more symbols) in the first slot, and a portion (e.g., one or more other symbols) in the second slot. In other words, the SL synchronization communication resources may include one or more SL synchronization candidate locations located across slots. In some examples, aspects of the operations of 1520 may be performed by the sidelink communication module 1308 as described with reference to FIG. 13.

As mentioned above, the SL synchronization communication resources indicated in the first configuration may include one or more slots allocated for one or more SL synchronization communications. In another aspect, the SL synchronization communication resources may include resources in the SL resource pool, such that the SL resource pool includes SL data resources and SL synchronization communication sources. In some aspects, the SL synchronization communication resources include a combination of SL synchronization communication slots and SL synchronization communication resources in the SL resource pool. In some aspects, the method 1500 may further include receiving a signal activating: the one the one or more slots allocated for the one or more SL synchronization communications; the further SL synchronization resources and the SL data resources; or a combination thereof. In some aspects, receiving the signal may include receiving the first configuration. For example, the first configuration may include a field, parameter, value, or other indicator indicating a trigger to activate the SL synchronization resources described above.

FIG. 16 shows a flowchart illustrating a method 1600 that supports S-SSB designs for shared spectrum in accordance with one or more aspects of the present disclosure. The operations of the method 1600 may be implemented by a UE or its components as described herein. For example, the operations of the method 1600 may be performed by a UE 115 as described with reference to FIGS. 1 through 12C. In some examples, a UE may execute a set of instructions to control the functional elements of the UE to perform the described functions. Additionally, or alternatively, the UE may perform aspects of the described functions using special-purpose hardware.

At 1605, the method may include the wireless communication device receiving a first configuration indicating sidelink (SL) synchronization communication resources. In some aspects, the SL synchronization communication resources comprise a first portion of a shared frequency band. The first portion of the shared frequency band may include a plurality of RBs. In some aspects, the wireless communication device includes a user equipment (UE) configured for SL communication in a shared frequency band. For example, the UE may be configured for SL-unlicensed (SL-U) communications with one or more other UEs in the shared frequency band. In some aspects, receiving the first configuration may include receiving one or more radio resource control (RRC) messages or information elements indicating one or more parameters for the SL synchronization communication resources. In some aspects, the SL synchronization communication resources may include time-frequency resources for communicating SL synchronization signal blocks (S-SSBs). In some aspects, the SL synchronization communication resources may include one or more slots and/or one or more symbols in the time domain. In some aspects, the SL synchronization communication resources may include one or more SL synchronization communication candidates or instances. For example, the wireless communication device may be configured to select at least one S-SSB candidate from a plurality of configured candidates for communicating at least one S-SSB. In some aspects, the SL synchronization communication resources include at least one slot comprising 14 symbols. Some aspects, the at least one slot may include a plurality of symbols allocated for a physical broadcast channel (PBCH) signal, two or more symbols allocated for a primary synchronization signal (PSS), and two or more symbols allocated for a secondary synchronization signal (SSS). The final symbol may be a gap symbol. In this regard, the SL synchronization resources may be similar or identical to the resources illustrated in FIG. 11A.

In another aspect, the SL synchronization communication resources may include at least one slot including a first SSB candidate and a second SSB candidate. In some aspects, each of the SSB candidates include four contiguous symbols. In some aspects, a first symbol of each candidate is allocated for a PSS, the second and fourth symbols are allocated for a PBCH signal, and the third symbol is allocated for a combination of a SSS and the PBCH signal. In this regard, the SL synchronization communication resources may be similar or identical to the resources illustrated in FIG. 11B.

In some aspects, receiving the SL synchronization communication may include receiving a SL resource allocation configuration from a network entity. The SL resource allocation may be indicated in a SL BWP configuration provided by an RRC IE. For example, the SL synchronization configuration may be indicated in a SL-ResourcePool IE. In another aspect, receiving the SL synchronization communication may include receiving a SL-SyncConfig IE indicating the timing parameters associated with the communication of S-SSBs.

In some aspects, the first portion of the shared frequency band may include 11 resource blocks (RBs) of the shared frequency band. In another aspect, the SL synchronization communication resources may occupy 11 RBs for the PSS, and 20 RBs for the SSS and PBCH. In another aspect, the SL synchronization communication resources may include a subset of resources from an SL resource pool. For example, the SL resource pool may include time and frequency resources for SL data, SL control information, SL feedback information, and/or SL reference signals. In some aspects, the SL resource pool may include physical sidelink control channel (PSCCH) resources, physical sidelink shared channel (PSSCH) resources, physical sidelink feedback channel (PSFCH) resources, and/or any other suitable resources. The SL resource pool may include a subset of resources allocated for at least one S-SSB candidate, as shown in FIGS. 7 and 8, for example. Accordingly, the resources allocated for SL synchronization communications may include a combination of S-SSB slots and SL resource pool resources.

In some aspects, the first portion of the shared frequency band allocated for the SL synchronization communication may be below network specifications or requirements. For example, in some instances, the first portion of the shared frequency band may be below 2 MHz. In some aspects, the bandwidth occupied by the SL synchronization communication may be based on the subcarrier spacing (SCS) used for the communication. In other aspects, the first portion may be at or above 2 MHz, but may be below another OCB threshold. For example, the first portion may be less than 80% of the bandwidth of the shared frequency band. In some examples, aspects of the operations of 1605 may be performed by the sidelink communication module 1308 as described with reference to FIG. 13.

At 1610, the method 1600 includes the wireless communication device transmitting, based on the first configuration, a SL synchronization communication rate matched to occupy a second portion of the shared frequency band. In some aspects, the second portion of the shared frequency band is larger than the first portion of the shared frequency band, and includes the first portion of the shared frequency band. In some aspects, rate matching the SL synchronization communication includes or results in frequency-padding the SL synchronization communication such that additional RBs and/or REs in the frequency domain are occupied by the SL synchronization communication.

It will be understood that action 1610 may include aspects of the configuration 1000 shown in FIGS. 11A-12C. In this regard, transmitting the SL synchronization communication using the larger second SCS may include transmitting a S-SSB. Transmitting the S-SSB using the larger second SCS may cause the S-SSB to occupy a larger portion of the shared frequency band that would be occupied if the S-SSB were transmitted using the first SCS. In other words, transmitting the SL synchronization communication may include transmitting the SL synchronization occupying a second portion of the shared frequency band, the second portion of the shared frequency band being larger than the first portion and including the first portion. In some aspects, the second portion may comprise at least 2 MHz. In another aspect, the second portion may comprise at least 80% of the shared frequency band.

In another aspect, the SL synchronization communication resources comprise a slot and a first quantity of RBs, such as 11 RBs and/or 20 RBs as explained above. In another aspect, the first quantity of RBs may be allocated for a PBCH signal, a PSS signal, and a SSS signal. In some aspects, rate matching the SL synchronization communication may include rate matching the SL synchronization to occupy a second quantity of RBs larger than the first quantity of RBs. For example, the wireless communication device may rate match at least the PBCH to occupy 20 RBs, or more than 20 RBs. In some aspects, the second quantity of RBs may satisfy one or more channel occupancy thresholds and/or requirements. For example, in some aspects, the first quantity of RBs may occupy less than 2 MHz. The rate matched SL synchronization having the second quantity of RBs may occupy more than 2 MHz, in some aspects. In another example, the first quantity of RBs may not satisfy, for at least one SCS, a 80% OCB threshold. The second quantity of RBs may be at, near, or exceeding the 80% OCB threshold.

In another aspect, the SL synchronization communication resources comprise a slot, a first quantity of resource blocks (RBs) allocated for a physical broadcast channel (PBCH) signal, and a second quantity of RBs allocated for at least a primary synchronization signal (PSS). In some aspects, the first quantity of RBs is greater than the second quantity of RBs. For example, the SL synchronization communication resources may include one or more S-SSB candidates each having four symbols in the time domain. The first quantity of RBs may be 11 RBs, and the second quantity of RBs may be 20 RBs. The slot may comprise a first SL synchronization communication candidate and a second SL synchronization communication candidate. In some aspects, the transmitting the SL synchronization communication may include transmitting, in one of the first SL synchronization candidate or the second SL synchronization candidate: the PSS occupying the second quantity of RBs, and the PBCH signal rate matched to occupy a third quantity of RBs greater than the first quantity RBs. In some aspects, the third quantity of RBs may satisfy one or more channel occupancy thresholds and/or requirements. For example, in some aspects, the first quantity of RBs may occupy less than 2 MHz. The rate matched SL synchronization having the third quantity of RBs may occupy more than 2 MHz, in some aspects. In another example, the first quantity of RBs may not satisfy, for at least one SCS, a 80% OCB threshold. The second quantity of RBs may be at, near, or exceeding the 80% OCB threshold.

As mentioned above, the SL synchronization communication resources indicated in the first configuration may include one or more slots allocated for one or more SL synchronization communications. In another aspect, the SL synchronization communication resources may include resources in the SL resource pool, such that the SL resource pool includes SL data resources and SL synchronization communication sources. In some aspects, the SL synchronization communication resources include a combination of SL synchronization communication slots and SL synchronization communication resources in the SL resource pool, as illustrated in FIGS. 7 and 8, for example. In some aspects, the method 1600 may further include receiving a signal activating: the one the one or more slots allocated for the one or more SL synchronization communications; the further SL synchronization resources and the SL data resources; or a combination thereof. In some aspects, receiving the signal may include receiving the first configuration. For example, the first configuration may include a field, parameter, value, or other indicator indicating a trigger to activate the SL synchronization resources described above. In some examples, aspects of the operations of 1610 may be performed by the sidelink communication module 1308 as described with reference to FIG. 13.

The following provides an overview of aspects of the present disclosure:

Aspect 1. A method of wireless communication performed by a wireless communication device, the method comprising: receiving a first configuration indicating sidelink (SL) synchronization communication resources; receiving a second configuration indicating a SL resource pool, the SL resource pool associated with a first subcarrier spacing (SCS); transmitting, based on the first configuration, a SL synchronization communication based on a second SCS larger than the first SCS; and transmitting, based on the second configuration, a SL communication based on the first SCS.

Aspect 2. The method of aspect 1, wherein the second SCS is one of 30 kHz, 60 kHz, or 120 kHz.

Aspect 3. The method of any of aspects 1-2, wherein the first configuration indicates a first portion of a shared frequency band, the first portion being allocated for the SL synchronization communication, and wherein the transmitting the SL synchronization communication comprises transmitting the SL synchronization occupying a second portion of the shared frequency band, the second portion of the shared frequency band being larger than the first portion and including the first portion.

Aspect 4. The method of aspect 3, wherein the second portion comprises at least 80% of the shared frequency band.

Aspect 5. The method of any of aspects 3-4, wherein the transmitting the SL synchronization communication comprises rate matching the SL synchronization communication to occupy the second portion.

Aspect 6. The method of any of aspects 1-5, wherein the SL synchronization communication resources comprise one or more slots allocated for one or more SL synchronization communications, and wherein each of the one or more slots comprises two or more SL synchronization communication candidates.

Aspect 7. The method of aspect 6, wherein each of the one or more slots comprises three or more SL synchronization communication candidates.

Aspect 8. The method of any of aspects 6-7, wherein the one or more slots comprise a first slot and a second slot contiguous with the first slot, and wherein a first SL synchronization communication candidate occupies at least a portion of the first slot and at least a portion of the second slot.

Aspect 9. The method of any of aspects 6-8, wherein the SL resource pool comprises further SL synchronization resources and SL data resources, and wherein the further SL synchronization resources are allocated for at least one SL synchronization communication candidate.

Aspect 10. The method of any of aspects 1-9, wherein: the first configuration indicates one or more slots allocated for one or more SL synchronization communications; the second configuration indicates further SL synchronization resources and SL data resources; or a combination thereof.

Aspect 11. The method of aspect 10, further comprising: receiving a signal activating: the one or more slots allocated for the one or more SL synchronization communications; the further SL synchronization resources and the SL data resources; or a combination thereof.

Aspect 12. The method of any of aspects 1-11, wherein the wireless communication device is a user equipment (UE).

Aspect 13. A method of wireless communication performed by a wireless communication device, the method comprising: receiving a first configuration indicating sidelink (SL) synchronization communication resources, wherein the SL synchronization communication resources comprise a first portion of a shared frequency band for a SL synchronization communication; and transmitting, based on the first configuration, the SL synchronization communication rate matched to occupy a second portion of the shared frequency band, the second portion of the shared frequency band being larger than the first portion of the shared frequency band and including the first portion of the shared frequency band.

Aspect 14. The method of aspect 13, wherein: the SL synchronization communication resources comprise a slot and a first quantity of resource blocks (RBs); the first quantity of RBs is allocated for a physical broadcast channel (PBCH) signal, a primary synchronization signal (PSS), and a secondary synchronization signal (SSS); and the transmitting the SL synchronization communication comprises transmitting the SL synchronization communication such that at least the PBCH signal is rate matched to occupy a second quantity of RBs greater than the first quantity of RBs.

Aspect 15. The method of any of aspects 13-14, wherein: the SL synchronization communication resources comprise a slot, a first quantity of resource blocks (RBs) allocated for a physical broadcast channel (PBCH) signal, and a second quantity of RBs allocated for at least a primary synchronization signal (PSS), the first quantity of RBs is greater than the second quantity of RBs, the slot comprises a first SL synchronization communication candidate and a second SL synchronization communication candidate; and the transmitting the SL synchronization communication comprises transmitting, in one of the first SL synchronization candidate or the second SL synchronization candidate: the PSS occupying the second quantity of RBs; and the PBCH signal rate matched to occupy a third quantity of RBs greater than the first quantity of RBs.

Aspect 16. The method of any of aspects 13-15, wherein the SL synchronization communication resources comprise one or more slots allocated for one or more SL synchronization communications, and wherein each of the one or more slots comprises two or more SL synchronization communication candidates.

Aspect 17. The method of aspect 16, wherein each of the one or more slots comprises three or more SL synchronization communication candidates.

Aspect 18. The method of any of aspects 16-17, wherein the one or more slots comprise a first slot and a second slot contiguous with the first slot, and wherein a first SL synchronization communication candidate occupies at least a portion of the first slot and at least a portion of the second slot.

Aspect 19. The method of any of aspects 16-18, further comprising: receiving a second configuration indicating a SL resource pool, wherein the SL resource pool comprises further SL synchronization resources and SL data resources, and wherein the further SL synchronization resources are allocated for at least one SL synchronization communication candidate.

Aspect 20. The method of any of aspects 13-19, further comprising: receiving a second configuration indicating a SL resource pool; and wherein: the first configuration indicates one or more slots allocated for one or more SL synchronization communications; the second configuration indicates further SL synchronization resources and SL data resources; or a combination thereof.

Aspect 21. The method of aspect 20, further comprising: receiving a signal activating: the one or more slots allocated for the one or more SL synchronization communications; the further SL synchronization resources and the SL data resources; or a combination thereof.

Aspect 22. The method of any of aspects 13-21, wherein the wireless communication device is a user equipment (UE).

Aspect 23: An apparatus for wireless communication at a first UE, comprising a processor; memory coupled with the processor; and instructions stored in the memory and executable by the processor to cause the apparatus to perform a method of any of aspects 1-12.

Aspect 30: An apparatus for wireless communication at a first UE, comprising at least one means for performing a method of any of aspects 1-12.

Aspect 31: A non-transitory computer-readable medium storing code for wireless communication at a first UE, the code comprising instructions executable by a processor to perform a method of any of aspects 1-12.

Aspect 32: An apparatus for wireless communication at a first UE, comprising a processor; memory coupled with the processor; and instructions stored in the memory and executable by the processor to cause the apparatus to perform a method of any of aspects 13-22.

Aspect 33: An apparatus for wireless communication at a first UE, comprising at least one means for performing a method of any of aspects 13-22.

Aspect 34: A non-transitory computer-readable medium storing code for wireless communication at a first UE, the code comprising instructions executable by a processor to perform a method of any of aspects 13-22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of wireless communication performed at a wireless communication device, the method comprising:

receiving a first configuration indicating sidelink (SL) synchronization communication resources, wherein the SL synchronization communication resources comprise a first portion of a shared frequency band for a SL synchronization communication, wherein the SL synchronization communication resources comprise a first slot and a second slot, and wherein a SL synchronization communication candidate occupies at least a portion of the first slot and at least a portion of the second slot; and transmitting, in accordance with the first configuration, the SL synchronization communication rate matched to occupy a second portion of the shared frequency band, the second portion of the shared frequency band being larger than the first portion of the shared frequency band and including the first portion of the shared frequency band.

2. The method of claim 1, wherein:

the SL synchronization communication resources comprise a slot and a first quantity of resource blocks (RBs);

the first quantity of RBs is allocated for a physical broadcast channel (PBCH) signal, a primary synchronization signal (PSS), and a secondary synchronization signal (SSS); and the transmitting the SL synchronization communication comprises transmitting the SL synchronization communication such that at least the PBCH signal is rate matched to occupy a second quantity of RBs greater than the first quantity of RBs.

3. The method of claim 1, wherein:

the SL synchronization communication resources comprise a first quantity of resource blocks (RBs) allocated for a physical broadcast channel (PBCH) signal, and a second quantity of RBs allocated for at least a primary synchronization signal (PSS), the first quantity of RBs is greater than the second quantity of RBs; and the transmitting the SL synchronization communication comprises transmitting, in the SL synchronization candidate:

the PSS occupying the second quantity of RBs; and the PBCH signal rate matched to occupy a third quantity of RBs greater than the first quantity of RBs.

4. The method of claim 1, wherein each of the first slot and the second slot comprise two or more SL synchronization communication candidates.

5. The method of claim 4, wherein each of the first slot and the second slot comprise three or more SL synchronization communication candidates.

6. The method of claim 4, wherein the second slot is contiguous with the first slot.

7. The method of claim 4, further comprising:

receiving a second configuration indicating a SL resource pool, wherein the SL resource pool comprises further SL synchronization resources and SL data resources, and wherein the further SL synchronization resources are allocated for the SL synchronization communication candidate.

8. The method of claim 1, further comprising:

receiving a second configuration indicating a SL resource pool; and wherein:

the first configuration indicates one or more slots allocated for one or more SL synchronization communications;

the second configuration indicates further SL synchronization resources and SL data resources; or a combination thereof.

9. The method of claim 8, further comprising:

receiving a signal activating:

the one or more slots allocated for the one or more SL synchronization communications;

the further SL synchronization resources and the SL data resources; or a combination thereof.

10. The method of claim 1, wherein the wireless communication device is a user equipment (UE).

11. An apparatus, comprising:

one or more processors and one or more code-storing memories coupled with the one or more processors, the one or more processors when configured cause the apparatus to:

receive a first configuration indicating sidelink (SL) synchronization communication resources, wherein the SL synchronization communication resources comprise a first portion of a shared frequency band for a SL synchronization communication, wherein the SL synchronization communication resources comprise a first slot and a second slot, and wherein a SL synchronization communication candidate occupies at least a portion of the first slot and at least a portion of the second slot; and transmit, in accordance with the first configuration, the SL synchronization communication rate matched to occupy a second portion of the shared frequency band, the second portion of the shared frequency band being larger than the first portion of the shared frequency band and including the first portion of the shared frequency band.

12. The apparatus of claim 11, wherein:

the SL synchronization communication resources comprise a first quantity of resource blocks (RBs);

the first quantity of RBs is allocated for a physical broadcast channel (PBCH) signal, a primary synchronization signal (PSS), and a secondary synchronization signal (SSS); and the apparatus is configured to transmit the SL synchronization communication such that at least the PBCH signal is rate matched to occupy a second quantity of RBs greater than the first quantity of RBs.

13. The apparatus of claim 11, wherein:

the SL synchronization communication resources comprise a slot, a first quantity of resource blocks (RBs) allocated for a physical broadcast channel (PBCH) signal, and a second quantity of RBs allocated for at least a primary synchronization signal (PSS), the first quantity of RBs is greater than the second quantity of RBs; and the one or more processors are configured to cause the apparatus to transmit, in the SL synchronization candidate:

the PSS occupying the second quantity of RBs; and the PBCH signal rate matched to occupy a third quantity of RBs greater than the first quantity of RBs.

14. The apparatus of claim 11, wherein each of the first slot and the second slot comprise two or more SL synchronization communication candidates.

15. The apparatus of claim 14, wherein each of the first slot and the second slot comprise three or more SL synchronization communication candidates.

16. The apparatus of claim 14, wherein the second slot is contiguous with the first slot.

17. The apparatus of claim 14, wherein the one or more processors are configured to cause the apparatus to:

receive a second configuration indicating a SL resource pool, wherein the SL resource pool comprises further SL synchronization resources and SL data resources, and wherein the further SL synchronization resources are allocated for the SL synchronization communication candidate.

18. The apparatus of claim 11, wherein the one or more processors are configured to cause the apparatus:

receive a second configuration indicating a SL resource pool; and wherein:

the first configuration indicates one or more slots allocated for one or more SL synchronization communications;

the second configuration indicates further SL synchronization resources and SL data resources; or a combination thereof.

19. The apparatus of claim 18, wherein the one or more processors are configured to cause the apparatus:

receive a signal activating:

the one or more slots allocated for the one or more SL synchronization communications;

the further SL synchronization resources and the SL data resources; or a combination thereof.

20. The apparatus of claim 11, wherein the apparatus is a user equipment (UE).

21. A non-transitory, computer-readable medium storing a set of instructions for wireless communication, the set of instructions comprising:

one or more instructions that, when executed at a wireless communication device, cause the wireless communication device to:

receive a first configuration indicating sidelink (SL) synchronization communication resources, wherein the SL synchronization communication resources comprise a first portion of a shared frequency band for a SL synchronization communication, wherein the SL synchronization communication resources comprise a first slot and a second slot, and wherein a SL synchronization communication candidate occupies at least a portion of the first slot and at least a portion of the second slot; and transmit, in accordance with the first configuration, the SL synchronization communication rate matched to occupy a second portion of the shared frequency band, the second portion of the shared frequency band being larger than the first portion of the shared frequency band and including the first portion of the shared frequency band.

22. The non-transitory, computer-readable medium of claim 21, wherein:

the SL synchronization communication resources comprise a first quantity of resource blocks (RBs);

the first quantity of RBs is allocated for a physical broadcast channel (PBCH) signal, a primary synchronization signal (PSS), and a secondary synchronization signal (SSS); and the one or more instructions further cause the wireless communication device to transmit the SL synchronization communication such that at least the PBCH signal is rate matched to occupy a second quantity of RBs greater than the first quantity of RBs.

23. The non-transitory, computer-readable medium of claim 21, wherein:

the SL synchronization communication resources comprise a slot, a first quantity of resource blocks (RBs) allocated for a physical broadcast channel (PBCH) signal, and a second quantity of RBs allocated for at least a primary synchronization signal (PSS), the first quantity of RBs is greater than the second quantity of RBs; and the one or more instructions further cause the wireless communication device to transmit, in the SL synchronization candidate:

the PSS occupying the second quantity of RBs; and the PBCH signal rate matched to occupy a third quantity of RBs greater than the first quantity of RBs.

24. The non-transitory, computer-readable medium of claim 21, wherein each of the first slot and the second slot comprise two or more SL synchronization communication candidates.

25. The non-transitory, computer-readable medium of claim 24, wherein each of the first slot and the second slot comprise three or more SL synchronization communication candidates.

26. The non-transitory, computer-readable medium of claim 24, wherein the second slot is contiguous with the first slot.

27. The non-transitory, computer-readable medium of claim 24, wherein the one or more instructions further cause the wireless communication device to:

receive a second configuration indicating a SL resource pool, wherein the SL resource pool comprises further SL synchronization resources and SL data resources, and wherein the further SL synchronization resources are allocated for the SL synchronization communication candidate.

28. The non-transitory, computer-readable medium of claim 21, wherein the one or more instructions further cause the wireless communication device to:

receive a second configuration indicating a SL resource pool; and wherein:

the first configuration indicates one or more slots allocated for one or more SL synchronization communications;

the second configuration indicates further SL synchronization resources and SL data resources; or a combination thereof.

29. A wireless communication device, comprising:

means for receiving a first configuration indicating sidelink (SL) synchronization communication resources, wherein the SL synchronization communication resources comprise a first portion of a shared frequency band for a SL synchronization communication, wherein the SL synchronization communication resources comprise a first slot and a second slot, and wherein a SL synchronization communication candidate occupies at least a portion of the first slot and at least a portion of the second slot; and means for transmitting, in accordance with the first configuration, the SL synchronization communication rate matched to occupy a second portion of the shared frequency band, the second portion of the shared frequency band being larger than the first portion of the shared frequency band and including the first portion of the shared frequency band.

30. The method of claim 1, wherein:

the SL synchronization communication resources comprise a first quantity of resource blocks (RBs); and the transmitting the SL synchronization communication comprises transmitting the SL synchronization communication such that at least a physical broadcast channel (PBCH) signal is rate matched to occupy a second quantity of RBs greater than the first quantity of RBs.

* * * * *